US006869548B2

United States Patent
Matsumoto

(10) Patent No.: US 6,869,548 B2
(45) Date of Patent: Mar. 22, 2005

(54) METHOD AND APPARATUS FOR MANUFACTURING A PLURALITY OF KINDS OF SHEETS HAVING IONIZING RADIATION CURING TYPE RESIN LAYER

(75) Inventor: Kazuyuki Matsumoto, Tokyo-to (JP)

(73) Assignee: Dai Nippon Printing Co., Ltd., Tokyo-to (JP)

( * ) Notice: Subject to any disclaimer, the term of this patent is extended or adjusted under 35 U.S.C. 154(b) by 452 days.

(21) Appl. No.: 09/989,631

(22) Filed: Nov. 20, 2001

(65) Prior Publication Data

US 2002/0063350 A1 May 30, 2002

(30) Foreign Application Priority Data

Nov. 29, 2000 (JP) ..................................... P2000-362600
Sep. 13, 2001 (JP) ..................................... P2001-278380

(51) Int. Cl.[7] ............................................. B29D 11/00
(52) U.S. Cl. ...................... 264/1.36; 264/40.1; 264/494
(58) Field of Search ................................ 264/1.36, 1.7, 264/40.1, 494, 1.34; 425/135, 169; 452/135, 169

(56) References Cited

U.S. PATENT DOCUMENTS 5,238,120 A * 8/1993 Ballestrazzi et al. ........ 209/539

FOREIGN PATENT DOCUMENTS

| DE | 19842510 | * | 3/2000 |
| JP | 0 7014873 | | 1/1995 |
| JP | 0 7148751 | | 6/1995 |

OTHER PUBLICATIONS

English Translation Abstract of DE 19842510.*

* cited by examiner

Primary Examiner—Michael P. Colaianni
Assistant Examiner—Yewebdar Tadesse
(74) Attorney, Agent, or Firm—Ladas & Parry LLP

(57) ABSTRACT

A method for manufacturing a plurality of kinds of sheets is provided. Each of sheets has a substrate and an ionizing radiation curing type resin layer on at least one of the substrate. There is carried out formation of the ionizing radiation curing type resin layer for each of the sheets, while changing forming conditions based on preset values for each of the sheets.

8 Claims, 26 Drawing Sheets

METHOD AND APPARATUS FOR MANUFACTURING A PLURALITY OF KINDS OF SHEETS HAVING IONIZING RADIATION CURING TYPE RESIN LAYER

BACKGROUND OF THE INVENTION

1. Field of the Invention

The present invention relates a method and an apparatus for manufacturing different kinds of sheets for example in their size by means of a single manufacturing line.

2. Description of the Related Art

Measures such as a press formation method, a thermal polymerization and an UV formation method have conventionally been applied in order to manufacture a plurality of sheet-shaped products such as lens sheets and hard-coat-sheets. For example, Japanese Laid-Open Patent Application No. H7-148751 discloses a method for manufacturing lens sheets utilizing the UV formation method.

With respect to manufacture of various kinds of sheets such as lens sheets and hard-coated sheets through a curing process of ionizing radiation curing type resin such as UV resin, the conventional apparatus has however generally been designed so as to permit manufacture of only a single kind of sheets by a single manufacturing line

SUMMARY OF THE INVENTION

An object of the present invention is therefore to provide a method and an apparatus, which permit to manufacture a plurality of kinds of sheets in a mixed state in a single manufacturing line.

In order to attain the aforementioned object, the method of the first aspect of the present invention for manufacturing a plurality of kinds of sheets, each having a substrate and an ionizing radiation curing type resin layer on at least one of said substrate, comprises:

carrying out formation of said ionizing radiation curing type resin layer for each of said plurality of kinds of sheets, while changing forming conditions based on preset values for each of said plurality of kinds of sheets.

According to the above-mentioned feature of the first aspect of the present invention, even when different kinds of forming molds for respective different kinds of sheets are conveyed with certain regularity in conveying order, which is for example patterned so that the different kinds of forming molds appear alternatively, it is possible to conduct formation of the ionizing radiation curing type resin layer for each of the plurality of kinds of sheets, while changing forming conditions based on the present values for such a conveying order.

In order to attain the aforementioned object, the method of the second aspect of the present invention for manufacturing a plurality of kinds of sheets, each having a substrate and an ionizing radiation curing type resin layer on at least one of said substrate, comprises:

identifying a kind of sheet to be manufactured by means of a sensor; and carrying out formation of said ionizing radiation curing type resin layer for each of said plurality of kinds of sheets, while changing forming conditions based on results of said identifying step.

According to the above-mentioned features of the second aspect of the present invention, detection of identification pieces, which are different from each other and attached on the different forming molds for the different kinds of sheets, respectively, utilizing a proximity sensor, makes it possible to identify the forming mold to which the formation steps are to be applied, leading to identification of the kind of sheet to be manufactured. It is therefore possible to manufacture the different kinds of sheets in an appropriate manner, while changing the forming conditions.

In order to attain the aforementioned object, the method of the third aspect of the present invention for manufacturing a plurality of kinds of sheets, each having a substrate and an ionizing radiation curing type resin layer on at least one of said substrate, comprises:

identifying a kind of sheet to be manufactured by means of a sensor; and carrying out formation of said ionizing radiation curing type resin layer for each of said plurality of kinds of sheets, while changing forming conditions based on both of preset values for each of said plurality of kinds of sheets and results of said identifying step.

According to the above-mentioned features of the third aspect of the present invention, it is possible to decrease the number of sensor, thus reducing the manufacturing cost.

In the forth aspect of the present invention, said formation may be conducted by utilizing a forming mold for at least one kind of sheets to be manufactured, said forming mold providing a sheet having a reproduced shape based on said forming mold. According to such a feature, it is possible to effectively manufacture sheets with requirement for the reproduced shape and the other sheets without such requirement in a mixed state by the same single manufacturing line.

In the fifth aspect of the present invention, said formation may be conducted by utilizing a cover film for at least one kind of sheets to be manufactured.

In the sixth aspect of the present invention, said formation may be conducted by carrying out the steps of: applying ionizing radiation curing type resin in a form of liquid on said forming mold to form an uncured resin body thereon; placing said substrate on said uncured resin body and then pressing said substrate against said uncured resin body to flatten said uncured resin body; irradiating ionizing radiation on said uncured resin layer through said substrate to cure said uncured resin layer; and removing said cured resin layer together with said substrate from said forming mold. According to such features of the sixth aspect of the present invention, it is possible to manufacture the sheets so as to prevent bubbles from being entrapped into the ionizing radiation curing type resin.

In the seventh aspect of the present invention, said formation may be conducted by carrying out the steps of: applying ionizing radiation curing type resin in a form of liquid on said substrate to form an uncured resin body thereon; placing said cover film on said uncured resin body and then pressing said cover film against said uncured resin body to flatten said uncured resin body; and irradiating ionizing radiation on said uncured resin layer through said pressure sheet to cure said uncured resin layer. According to such features of the seventh aspect of the present invention, it is possible to manufacture the sheets each having the substrate, the resin layer and the cover film.

In the eighth aspect of the present invention, said steps may further comprise removing said cured resin layer together with said substrate from said cover film after said irradiating step. According to such features of the eighth aspect of the present invention, it is possible to manufacture the sheets each having the substrate and the resin layer, without the cover layer.

In the ninth aspect of the present invention, said at least one kind of sheets may be a lens sheet for a transmission type screen. According to such features of the ninth aspect of the present invention, it is possible to manufacture various kinds of the lens sheets for the transmission type screen by the same single manufacturing line.

In the tenth aspect of the present invention, said forming conditions may include at least one of (i) a position in which the ionizing radiation curing type resin is to be applied, (ii) an amount of the ionizing radiation curing type resin; (iii) a kind of the ionizing radiation curing type resin; (iv) a size and thickness of said substrate; (v) a size and thickness of said forming mold; (vi) magnitude of pressing force applied to said substrate and (vii) a position to which the pressing force is to be applied. According to such features of the tenth aspect of the present invention, it is possible to continuously manufacture the different kinds of sheets under the prescribed forming conditions in accordance with the kinds of sheets.

In the eleventh aspect of the present invention, said forming conditions may include at least one of (i) a position in which the ionizing radiation curing type resin is to be applied, (ii) an amount of the ionizing radiation curing type resin; (iii) a kind of the ionizing radiation curing type resin; (iv) a size and thickness of said substrate; (v) a size and thickness of said cover film; (vi) magnitude of pressing force applied to said substrate and (vii) a position to which the pressing force is to be applied.

In order to attain the aforementioned object, the apparatus of the twelfth aspect of the present invention for manufacturing a plurality of kinds of sheets, each having an ionizing radiation curing type resin layer, comprises:

a control device, in which preset values of forming conditions for each of said plurality of kinds of sheets are previously input, for controlling formation of said ionizing curing type resin layer for each of said plurality of kinds of sheets, while changing forming conditions based on preset values for each of said plurality of kinds of sheets.

According to the above-mentioned features of the twelfth aspect of the present invention, even when different kinds of forming molds for respective different kinds of sheets are conveyed with certain regularity in conveying order, which is for example patterned so that the different kinds of forming molds appear alternatively, it is possible to conduct formation of the ionizing radiation curing type resin layer for each of the plurality of kinds of sheets, while changing forming conditions based on the present values for such a conveying order.

In order to attain the aforementioned object, the apparatus of the thirteenth aspect of the present invention for manufacturing a plurality of kinds of sheets, each having an ionizing radiation curing type resin layer, comprises:

a sensor for identifying a kind of sheet to be manufactured; and a control device, in which preset values of forming conditions for each of said plurality of kinds of sheets are previously input, for controlling formation of said ionizing curing type resin layer for each of said plurality of kinds of sheets, while changing the forming conditions based on results obtained by said sensor.

According to the above-mentioned features of the thirteenth aspect of the present invention, detection of identification pieces, which are different from each other and attached on the different forming molds for the different kinds of sheets, respectively, utilizing a proximity sensor, makes it possible to identify the forming mold to which the formation steps are to be applied, leading to identification of the kind of sheet to be manufactured. It is therefore possible to manufacture the different kinds of sheets in an appropriate manner, while changing the forming conditions.

In order to attain the aforementioned object, the apparatus of the fourteenth aspect of the present invention for manufacturing a plurality of kinds of sheets, each having an ionizing radiation curing type resin layer, comprises:

a sensor for identifying a kind of sheet to be manufactured; and a control device, in which preset values of foaming conditions for each of said plurality of kinds of sheets are previously input, for controlling formation of said ionizing curing type resin layer for each of said plurality of kinds of sheets, while changing the forming conditions based on both of preset values for each of said plurality of kinds of sheets and results obtained by said sensor.

According to the above-mentioned features of the fourteenth aspect of the present invention, it is possible to decrease the number of sensor, thus reducing the manufacturing cost.

In the fifteenth aspect of the present invention, the apparatus may further comprise a conveying device for conveying a forming mold for each of said plurality of kinds of sheets; an application device for applying ionizing radiation curing type resin in a form of liquid on said forming mold to form an uncured resin body thereon; a substrate supply device for placing a substrate on said uncured resin body; a pressing device for pressing said substrate against said uncured resin body to flatten said uncured resin body, so as to form a uncured resin layer; and an irradiation device for irradiating ionizing radiation on said uncured resin layer through said substrate to cure said uncured resin layer. According to such features of the fifteenth aspect of the present invention, it is possible to manufacture the sheets so as to prevent bubbles from being entrapped into the ionizing radiation curing type resin.

In the sixteenth aspect of the present invention, the apparatus may further comprise a conveying device for conveying a substrate for each of said plurality of kinds of sheets; an application device for applying ionizing radiation curing type resin in a form of liquid on said substrate to form an uncured resin body thereon; a cover film supply device for placing a cover film on said uncured resin body; a pressing device for pressing said cover film against said uncured resin body to flatten said uncured resin body, so as to form a uncured resin layer; and an irradiation device for irradiating ionizing radiation on said uncured resin layer through said cover film to cure said uncured resin layer.

In the seventeenth aspect of the present invention, said application device may have a plurality of nozzles for applying the ionizing radiation curing type resin. According to such features of the seventeenth aspect of the present invention, the ionizing radiation curing type resin is discharged from the plurality of nozzles so as to provide a sufficient amount of resin as supplied, while preventing bubbles from being entrapped between the resin layer and the forming mold. It is also possible to make a selection of the nozzles in accordance with the kind of forming mold so as to provide an appropriate application of resin according to the properties of the forming mold.

In the eighteenth aspect of the present invention, said plurality of nozzles may apply different kinds of ionizing radiation curing type resin. According to such features of the eighteenth aspect of the present invention, it is possible to easily supply the ionizing radiation curing type resin required to manufacture the sheet to make application thereof.

In the nineteenth aspect of the present invention, said plurality of nozzles may include a plurality of multiple nozzles, each of said multiple nozzles having a structure in which a plurality of micro nozzles are place in a row. According to such features of the nineteenth aspect of the present invention, it is possible to uniformly apply the ionizing radiation curing type resin on the forming mold. Closing certain micro nozzles on the end side of the above-mentioned row makes it easy to change an application width in accordance with the size of the forming mold.

In the twentieth aspect of the present invention, said substrate supply device may include a plurality of suction cups for sucking said substrate, each of said suction cups being switchable between a suction state and a non-suction state. According to such features of the twentieth aspect of the present invention, it is possible to cause only the suction cups as required in accordance with the size of the substrate, which may vary depending on the kind of sheet, to ensure a sucking operation of the various kinds of substrate. Selection of the suction cups to be used may be achieved on the basis of the results of identification of the substrate by the sensor serving as the identifying device.

In the twentieth aspect of the present invention, said cover film supply device may include a plurality of suction cups for sucking said cover film, each of said suction cups being switchable between a suction state and a non-suction state.

In the present invention, the "forming mold" means a device for forming or molding a lens sheet and includes a forming die.

DETAILED DESCRIPTION OF THE PREFERRED EMBODIMENTS

Figure 1A:
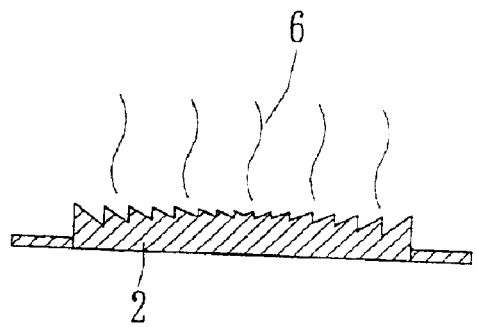
FIGS. 1(A) to 1(G) are descriptive views illustrating steps in sequence of a lens sheet manufacturing method in which an apparatus of the first embodiment of the present invention is used.
Figure 1B:
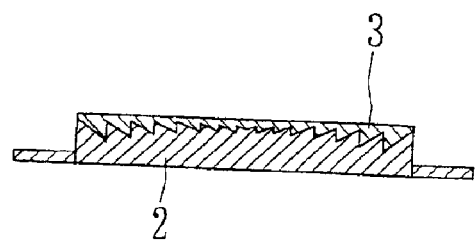
Figure 1C:
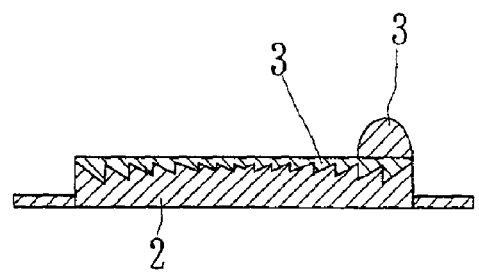
Figure 1D:
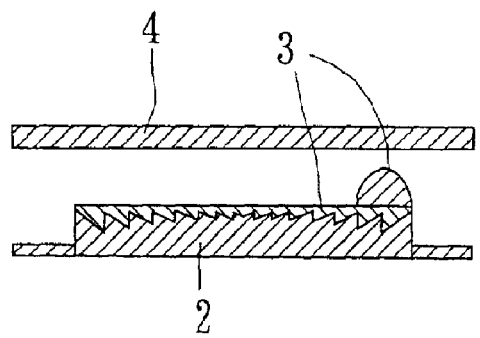
Figure 1E:
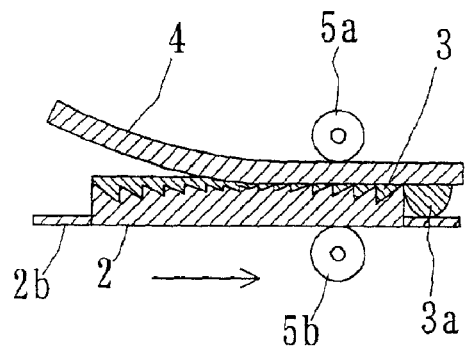
Figure 1F:
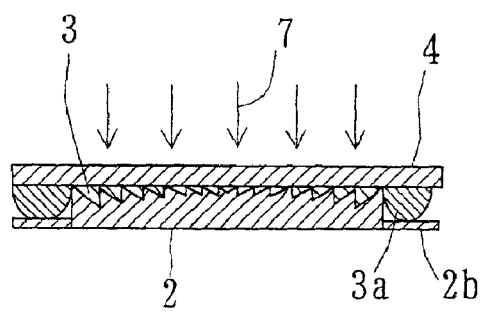
Figure 1G:
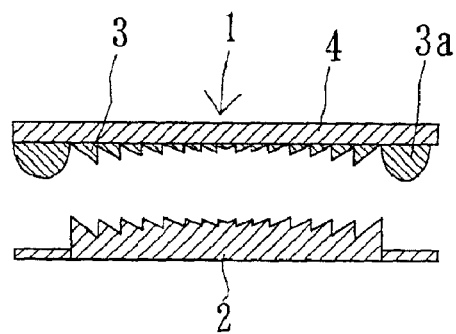

Now, embodiments of the present invention will be described in detail below with reference to the accompanying drawings.

<First Embodiment>

A lens sheet is manufactured in accordance with a manufacturing method as shown in FIG. 1. The lens sheet 1 is a Fresnel lens sheet. The method of the present invention may be applied not only to the manufacture of the Fresnel lens sheets, but also to the manufacture of lend sheets such as lenticular lens sheets and compound eye-type lens sheets, as well as sheets such as prism sheets and relief hologram sheets, which are obtained with the use of a forming mold.

As shown in FIGS. 1(A) to 1(G), the lens sheet 1 is manufactured by carrying out a temperature adjusting step (A) for making adjustment of temperature of a forming mold 2 for the lens sheet 1 to a prescribed temperature, which is suitable to formation of the lens sheet 1; the first resin-application step (i.e., the full-surface application step) (B) for applying ionizing radiation curing type resin 3 in the form of liquid on the entirety of the upper surface of the forming mold 2, to which the above-mentioned temperature adjusting step (A) has been applied, to form the first uncured resin layer; the second resin-application step (i.e., the partial-surface application step) (C) for applying the ionizing radiation curing type resin 3 in the form of liquid on one side, i.e., a pressing-starting side of the first uncured layer, which has been applied on the forming mold 2, to form an uncured resin pool; a substrate supplying step (D) for placing a substrate 4, through which ionizing radiation permeates, on the first uncured resin layer and the uncured resin pool from above the forming mold 2; a laminating step (E) for pressing the substrate 4 and the forming mold 2 from the pressing-starting side toward the pressing-finishing side by means of a pair of pressing rollers 5a, 5b to spread the uncured resin pool over the first uncured resin layer and flatten it, thereby forming the second uncured resin layer on the first uncured resin layer so as to provide a laminate structure of the first and second uncured resin layers and the substrate 4; a resin-curing step (F) for irradiating ionizing radiation onto the first and second uncured resin layers through the substrate 4 to cure them; and a removing step (G) for removing the ionizing radiation curing type resin 3 as cured from the forming mold 2 together with the substrate 4.

Figure 3:
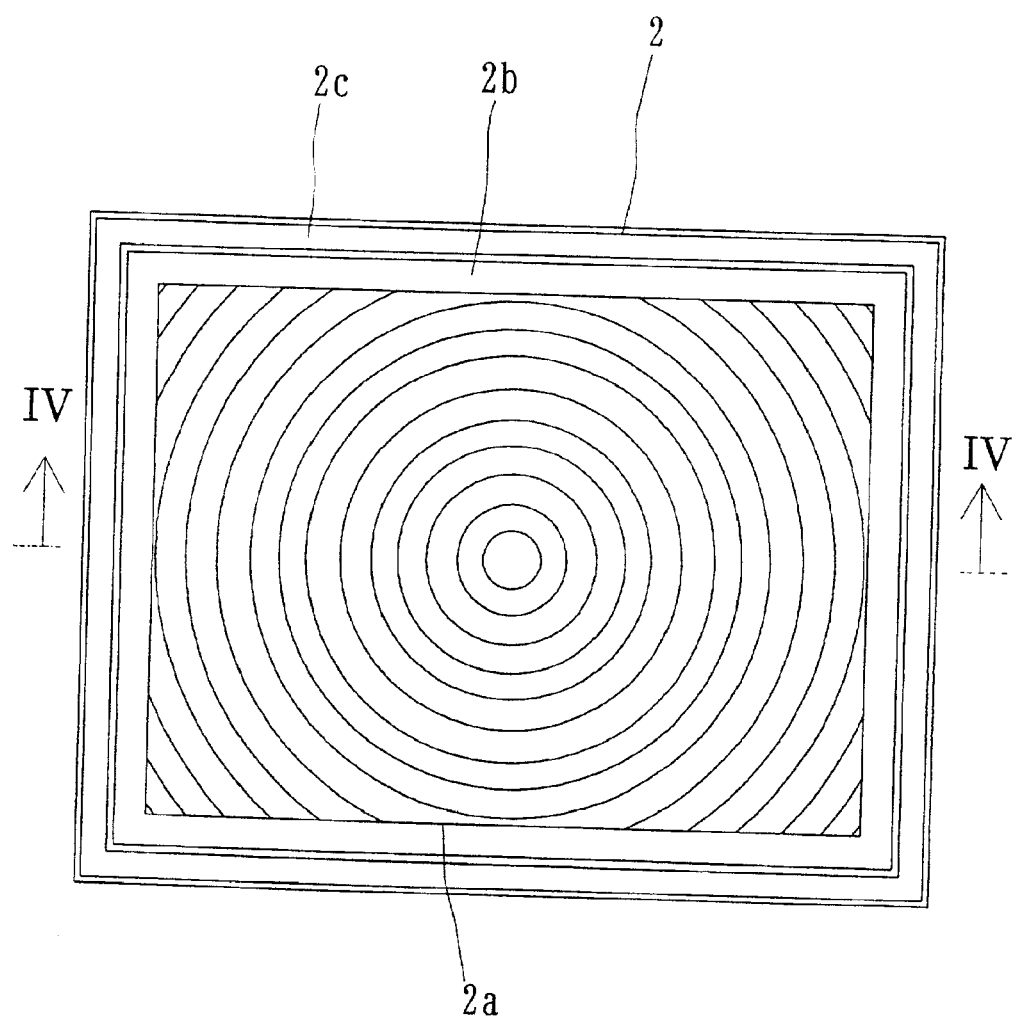
FIG. 3 is a plan view of a forming mold.
Figure 4:
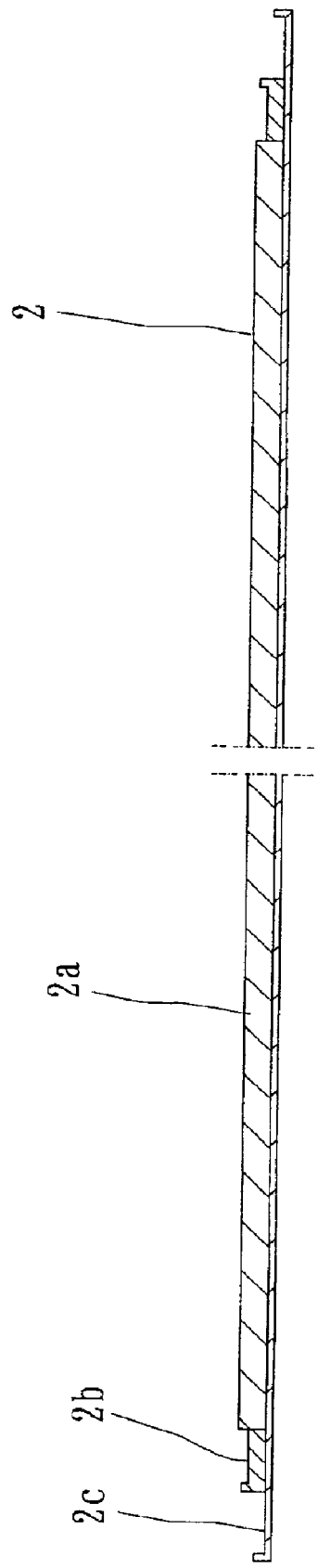
FIG. 4 is a cross-sectional view cut along the line IV—IV in FIG. 3.

The forming mold 2 used in the method of the present invention has a mold body 2a, a receiving member 2b surrounding the periphery of the mold body 2a and a base plate 2c having a disc-shape so as to surround the receiving member 2b, as shown in FIGS. 3 and 4. The receiving member 2*b* and the base plate 2*c* may be omitted, as an occasion demands. The mold body 2*a*, which is a metallic mold formed by for example an electroforming method, has on its upper surface a lens formation surface on which ionizing radiation curing type resin is to be applied. A cutting mold, an electroforming mold, a resin mold or the like may be used as the mold body 2*a*. The receiving member 2*b*, which projects outside from the four peripheral sides of the mold body 2*a*, receives the superfluous amount of ionizing radiation curing type resin 3*a* overflowed from the mold body 2. The base plate 2*c* supports the mold body 2*a* and the receiving member from below thereof. The mold body 2*a* as illustrated has a single lens formation surface for the single Fresnel lens sheet. The mold body 2*a* may however have a plurality of lens formation surfaces on which a layout of a prescribed pattern has been made so as to provide a plurality of Fresnel lens sheets.

The temperature-adjusting step (A) is to heat uniformly the forming mold 2 to a temperature, which is suitable to formation of the lens sheet. The step (A) is carried out for example by blowing hot air 6 heated by an electric heater, dried vapor or the like on the forming mold 2 in a prescribed period of time. The blowing step of the hot air 6 may be applied uniformly to the entirety of the forming mold 2, or in a manner that a flow rate of the hot air 6 is increased for a local portion, which is apt to be cooled. The flow rate of the hot air 6 can be adjusted by changing opening areas of a plurality of nozzles, while blowing the hot air 6 from these nozzles, or regulating an opening of a damper, which is provided on the upstream side of the nozzle. The temperature adjustment of the forming mold 2 can also be made with the use of a temperature adjustment device disposed on the forming mold 2.

In case where the ionizing radiation curing type resin 3 applied in accordance with the first resin-application step (B) and the second resin-application step (C) contains solvent, the above-described temperature-adjusting step (A) has functions not only of heating the forming mold 2, but also of removing the solvent. Removal of the solvent from the ionizing radiation curing type resin 3 prevents bubbles from being entrapped in the lens. The forming mold 2 may be heated excessively by ionizing radiation 7, which is irradiated in accordance with the resin-curing step (F). In such a case, the temperature adjusting step (A) makes it possible to cool the forming mold 7 excessively heated to an optimum temperature.

The first resin-application step (i.e., the full-surface application step) (B) is to apply the ionizing radiation curing type resin 3 in the form of liquid on the entirety of the upper surface of the forming mold 2, to which the temperature-adjusting step (A) has been applied, to form the first uncured layer. In such a step (B), the ionizing radiation curing type resin 3 is poured in the form of liquid on the forming mold 2 for example through a single nozzle or a plurality of nozzles. Application of the ionizing radiation curing type resin 3 in the form of liquid is conducted, while one or both of the forming mold 2 and the nozzle is traveled. It is preferable to apply the ionizing radiation curing type liquid resin 3 on the forming mold 2 from one side thereof to the other side thereof, while pouring the resin 3 in the form of threads from a plurality of nozzles each having a small discharging opening. This makes it possible to prevent air from being entrapped into lens formation grooves on a lens formation surface of the forming mold 2. The forming mold 2 has also been subjected to the temperature adjustment step to be heated uniformly. Accordingly, the ionizing radiation curing type liquid resin as applied rapidly extends over the lens formation grooves without entrapping bubbles.

Ultraviolet ray curing type resin, electron beam curing type resin or the like may be used as the ionizing radiation curing type liquid resin 3.

The second resin-application step (i.e., the partial-surface application step) (C) is to apply the ionizing radiation curing type liquid resin 3 on one side, i.e., the pressing-starting side of the first uncured layer, which has been applied on the forming mold 2, to from an uncured resin pool on the pressing-starting side. The ionizing radiation curing type liquid resin is poured on the forming mold 2 through the same single nozzle or plurality of nozzles as in the first resin-application step (B) or an ordinary single nozzle to form the uncured resin pool. The second resin-application step (C) may be omitted as an occasion demands.

The substrate supplying step (D) is to place a substrate 4 on the first uncured resin layer and the uncured resin pool of the ionizing radiation curing type resin 3 from above the forming mold 2. For example, a plurality of suction cups disposed on a plane suck the substrate 4 having a sheet-shape and are moved to carry the substrate 4 on the forming mold 2 on which the first uncured resin layer and the uncured resin pool of the ionizing radiation curing type resin 3 have been formed. The sucking action of the suction cups is released so that the substrate 4 drops on the first uncured resin layer and the uncured resin pool of the ionizing radiation curing type resin 3, thus adhering on the surface of the ionizing radiation curing type resin 3.

The substrate 4 is formed of a transparent thin sheet such as an acrylic resin sheet through which ionizing radiation such as ultraviolet ray or electron beam permeates.

The laminating step (E) is to press the substrate 4 against the first uncured resin layer and the uncured resin pool of the ionizing radiation curing type resin 3 on the forming mold 2 from the pressing-starting side toward the pressing-finishing side. More specifically, the forming mold 2 on which the first uncured resin layer and the uncured resin pool of the ionizing radiation curing type resin 3 have been formed and then the substrate 4 has been placed thereon, is passed between a pair of pressing rollers 5*a*, 5*b* to spread the uncured resin pool over the first uncured resin layer, so as to form the second uncured resin layer on the first uncured resin layer. As a result, the first uncured resin layer and the second uncured resin layer are combined into a united layer having a uniform thickness. The uncured resin pool of the ionizing radiation curing type resin 3 applied in accordance with the second resin-application step (C) is spread over the first uncured resin layer from the pressing-starting side toward the pressing-finishing side so as to press bubbles out of the ionizing radiation curing type resin 3, thus preventing bubbles from being entrapped between the substrate 4 and the forming mold 2. Of the pair of pressing rollers 5*a*, 5*b*, the upper roller 5*a*, which comes into contact with the substrate 4, is provided with a crown. Such a crown causes the ionizing radiation curing type resin 3 to flow smoothly into the lens formation grooves, which are formed concentrically, without entrapping bubbles in these grooves. In addition, the forming mold 2 is previously subjected to the temperature adjustment in the laminating step (E). As a result, the ionizing radiation curing type resin 3 flows smoothly on the forming mold 2, which is heated to an appropriate temperature, and comes securely in close contact with the substrate 4.

The resin-curing step (F) is to irradiate ionizing radiation onto the first and second uncured resin layers through the substrate 4 to cure them. More specifically, a radiation source such as an ultraviolet ray lamp is disposed above the forming mold 2 to irradiate uniformly ionizing radiation 7 on the substrate 4. The ionizing radiation 7, which permeates through the substrate 4, acts on the ionizing radiation curing type resin 3 applied on the forming mold to cure it. The ionizing radiation curing type resin 3 as cured adheres firmly to the substrate 4.

The removing step (G) is to remove the ionizing radiation curing type resin 3 as cured thorough irradiation of the ionizing radiation 7 from the forming mold 2 together with the substrate 4. More specifically, manual operations will be carried out as follows. First, the central portion of the substrate 4 is urged against the forming mold 2 and the opposite portions 4b, 4d placed along a diagonal line of the lens sheet 1 are caught and lifted up. Accordingly, the ionizing radiation curing type resin 3 is peeled from the forming mold 2 from the vicinities to the opposite portions toward the central portion. Then, the opposite portions placed along the diagonal line of the substrate 4 are moved down on the forming mold 2. The other opposite portions placed along the other diagonal line of the substrate 4 are caught and lifted up. Accordingly, the ionizing radiation curing type resin 3 is peeled from the forming mold 2 from the vicinities to the other opposite portions toward the central portion. Finally, all the two pairs of opposite portions are caught and lifted up simultaneously so that the whole ionizing radiation curing type resin 3 is completely peeled from the forming mold 2.

Figure 2A:
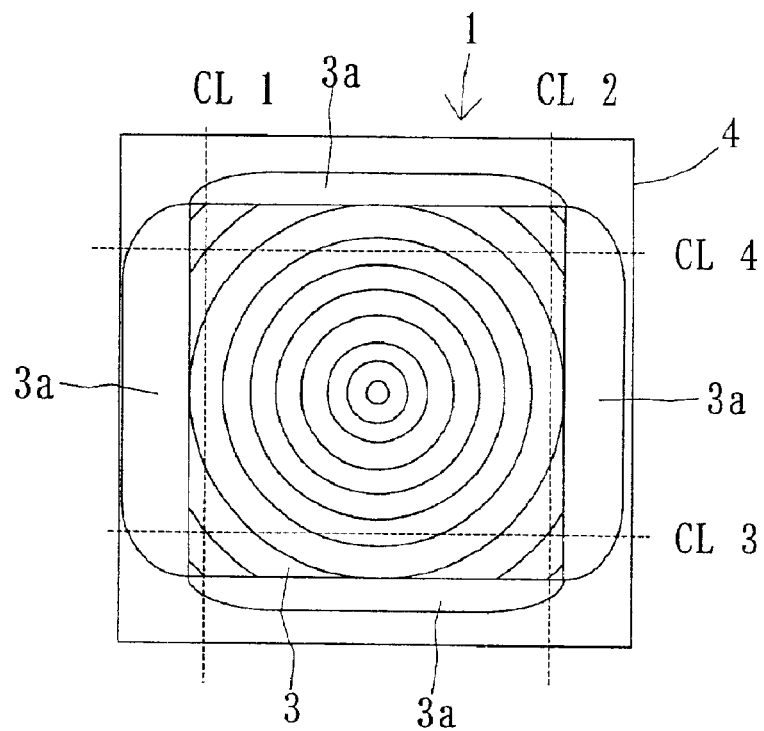
FIGS. 2(A) and 2(B) are plan views of a lens sheet manufactured by the lens sheet manufacturing apparatus as shown in FIG. 1.
Figure 2B:
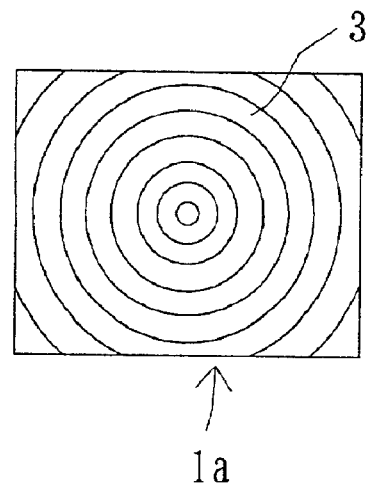

The Fresnel lens sheet 1 can be prepared by carrying out all of the steps (A) to (G). The substrate 4 of the Fresnel lens sheet 1 has a superfluous amount of ionizing radiation curing type resin 3, which has extended from the four sides of the forming mold 2 to adhere on the substrate 4 and been cured, as shown in FIG. 2(A). Cutting operations of useless end portions having a superfluous amount of ionizing radiation curing type resin 3 are applied, as an occasion demands, to the Fresnel lens sheet 1 along cutting lines CL1, CL2, CL3 and CL4 as shown in FIG. 2(A) to remove the useless end portions, thus obtaining the Fresnel lens sheet 1a as the finished product.

In the lens sheet manufacturing method of the present invention, the lens sheets are continuously manufactured, while conveying a plurality of forming molds for them by means of an endless conveying device. Zones for carrying out the temperature adjusting step (A), the first resin-application step (B), the second resin-application step (C), the substrate supplying step (D), the laminating step (E), the resin-curing step (F) and the removing step (G) as described above, respectively, are provided along the endless conveying device.

With respect to the forming mold 2, there are prepared a plurality of different kinds of forming molds. The different kinds of lens sheets are continuously manufactured, while conveying these forming molds in a mixed state by means of the endless conveying device. In addition, the forming molds conveyed in such a manner include the forming mold having the single lens formation surface and the mold having the plurality of lens formation surfaces.

The kinds of lens sheets to be manufactured are different from each other and the kinds of forming molds for them are also different from each other. Consequently, forming conditions such as an application starting position, an application finishing position, an application width and an amount of application of the ionizing radiation curing type resin; a size of the substrate; and magnitude of pressing force applied to the substrate, also change depending on such differences. In the lens sheet manufacturing method of the present invention, an identification device identifies the kind of forming mold so that the forming conditions are changed in an appropriate manner based on results of the identification.

With respect to the identification device, there are adopted measures to identify the kind of forming mold based on the preset values for each of the forming molds so as to permit to make a change in the forming conditions. More specifically, when the different kinds of forming molds are conveyed in order, which is for example patterned so that the different kinds of forming molds appear alternatively, the forming conditions are changed on the basis of such a patterned order. Alternatively, a sensing system may be adopted. In such a case, identification pieces, which are distinguishable from each other, are attached onto the corresponding forming molds. A sensor detects the above-mentioned identification piece to identify the kind of the forming mold. In addition, the above-mentioned preset system and the sensing system may be used in combination.

After the kind of forming mold is identified by means of the identification device on the endless conveying device, the forming conditions such as an application starting position, an application finishing position, an application width and an amount of application of the ionizing radiation curing type resin; a size of the substrate; and magnitude of pressing force applied to the substrate are changed to coincide with the optimum forming conditions for the forming mold as identified, to carry out the manufacturing steps in sequence. The different kinds of lens sheets are continuously manufactured in this manner.

Now, description will be given below of a manufacturing apparatus, which is applied to carry out the method for manufacturing the above-mentioned lens sheet.

Figure 5:
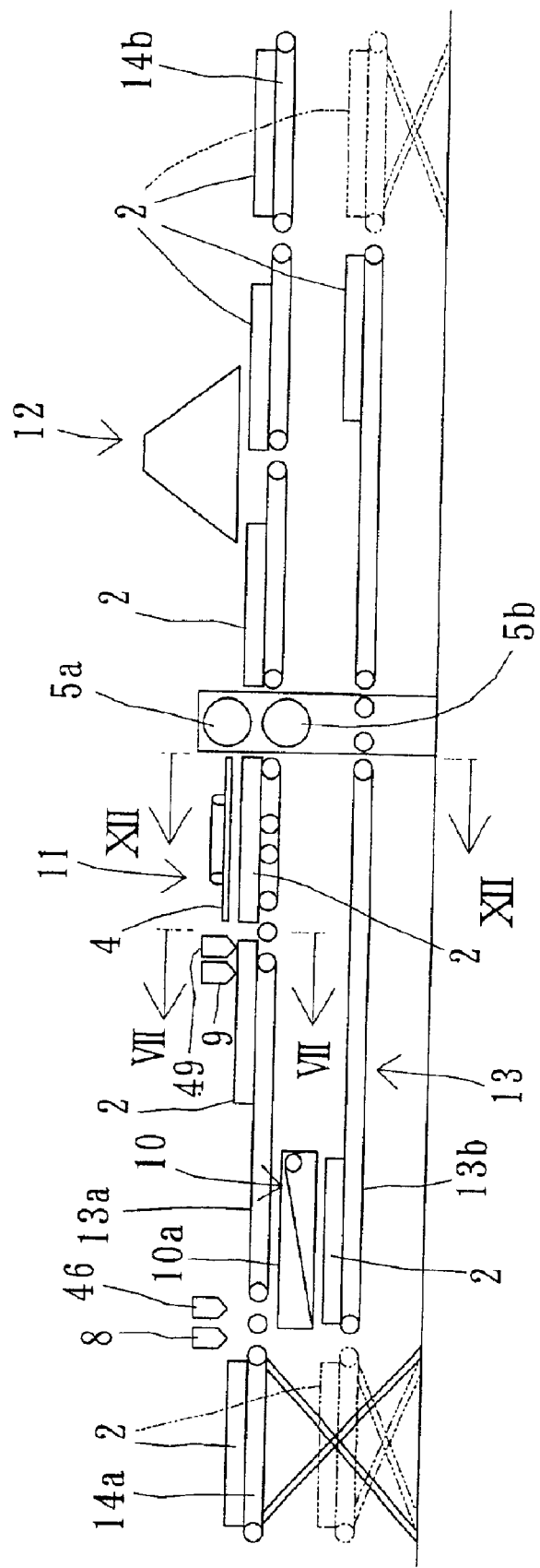
FIG. 5 is an elevation view illustrating the lens sheet manufacturing apparatus.

The apparatus for manufacturing a lens sheet includes, as shown in FIG. 5, a mold-temperature adjusting device 10, the first nozzle 8 serving as the first application device, the second nozzle 9 serving as the second application device, a substrate supply device 11, a pair of pressing rollers 5a, 5b and an ionizing radiation irradiating device 12. The temperature-adjusting device 10 adjusts temperature of the forming mold 2 for the lens sheet 1 to a suitable temperature for formation of the lens sheet. The first nozzle 8 is used to apply the ionizing radiation curing type resin in the form of liquid on the entirety of the upper surface of the forming mold 2, the temperature of which has already been adjusted, to form the first uncured resin layer thereon. The second nozzle 9 is used to apply the ionizing radiation curing type resin in the form of liquid on a pressing-starting side of the first uncured layer to form an uncured resin pool. The substrate supply device 11 places the substrate 4, through which ionizing radiation 7 permeates, on the first uncured resin layer and the uncured resin pool from above the forming mold 2. The pair of pressing rollers 5a, 5b presses the substrate 4 and the forming mold 2 from the pressing-starting side toward the pressing-finishing side to spread the uncured resin pool over the first uncured resin layer, thereby forming the second uncured resin layer on the first uncured resin layer. The ionizing radiation irradiating device 12 irradiates ionizing radiation 7 onto the first and second uncured resin layers of the ionizing radiation curing type resin 3 through the substrate 4 to cure them.

The lens sheet manufacturing apparatus of the present invention has the conveying device 13 by which a plurality of forming molds 2 can be circulated therein. The conveying device 13 is provided on its upper side with a traveling passage 13a for the forming molds 2 and on its lower side with a returning passage 13b for them. The traveling passage 13a and the returning passage 13b are composed of a roller conveyer, a chain conveyer or the like. The conveying device 13 is provided on its opposite ends with lifters 14a, 14b. One lifter 14a has a function of moving the forming mold 2, which has been returned on the returning passage 13b, upward to the traveling passage 13a. The other lifter 14b has a function of moving the forming mold 2, which has been conveyed on the traveling passage 13a, downward to the returning passage 13b. The first and second nozzles 8, 46, 9, 49, the substrate supply device 11, the pressing rollers 5a, 5b and the ionizing radiation irradiating device 12 are disposed along the traveling passage 13a of the conveying device 13. The temperature-adjusting device 10 is disposed along the returning passage 13b of the conveying device 13. Each of the traveling passage 13a and the returning passage 13b of the conveying device 13 is divided into a plurality of endless conveying units, which can independently be driven at the respective independent speed or stopped in accordance with the steps carried out by the first and second nozzles 8, 46, 9, 49, the substrate supply device 11, the pressing rollers 5a, 5b and the ionizing radiation irradiating device 12.

A plurality of molds for forming a certain kind of lens sheets are prepared as the forming molds 2. A plurality of other molds for forming a different kind of lens sheets are also prepared. These different kinds of molds are disposed in a line in a mixed state on the conveying device 13. The two different kinds of lens sheets are manufactured, while conveying the two different kinds of forming molds on the same endless conveying device. Three or more different kinds of lens sheets may be manufactured, while conveying the three or more different kinds of forming molds thereon.

Here, the "different kinds of forming molds" means molds that are different in size, design, material and the like.

Identification of the two or more different kinds of forming molds 2 can be carried out on the basis of either preset system or sensing system alone, or the combination thereof.

In the preset system, preset values of information on the number, kind, conveying order and the like of the forming molds 2, which are to be placed on the endless conveying device 13, are previously input into a not-shown control device of the lens sheet manufacturing apparatus. The control device has a counting unit for counting the number of forming molds, which are conveyed on the conveying device. Such a counting operation contributes to identification of the kind of forming mold in cooperation of the preset values as input. The control device controls the first nozzles 8, 46, the second nozzles 9, 49, the substrate supply device 11 and the pressing rollers 5a, 5b for each of the forming molds on the basis of signals from the counting unit.

Figure 6:
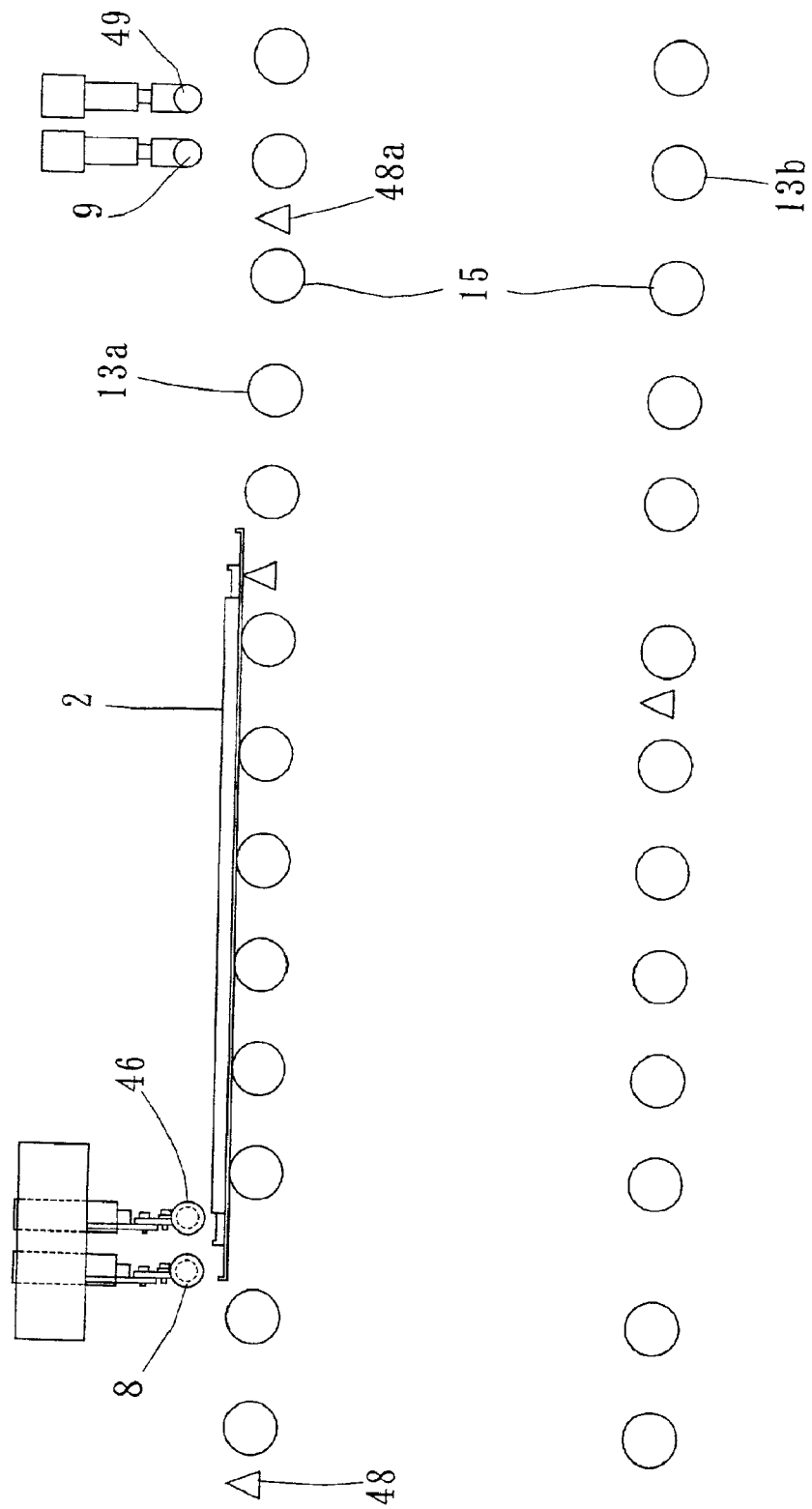
FIG. 6 is a view illustrating arrangement of the first nozzle.

In the sensing system, a sensor for identifying the kind of forming mold is provided in each of apparatus units for the first nozzle 8, 46, the second nozzles 9, 49, the substrate supply device 11 and the pressing rollers 5a, 5b. For example, a proximity sensor 48 is disposed on the upstream side of the first nozzles 8, 46, the other proximity sensor 48a is disposed on the upstream side of the second nozzles 9, 49, as shown in FIG. 6. Each of the apparatus units identifies the kind of forming mold 2 on the basis of the signal from the sensors 48, 48a, to change independently the control sequence.

In combination of the preset system and the sensing system, a proximity sensor is for example disposed on the upstream side of the first nozzles 8 and 46. The preset values of information on the number, kind, conveying order and the like of the forming molds 2, which are to be placed on the endless conveying device 13, are previously input into the not-shown control device of the lens sheet manufacturing apparatus. The first nozzle 8, 46, the second nozzles 9, 49, the substrate supply device 11 and the pressing rollers 5a, 5b operate in a conjunction manner on the basis of the information on the forming mold, which is identified by the sensor, in accordance with control program, which has previously been input into the control device. The forming molds, for example, four to ten forming molds are placed on the endless conveying device. The information given to the apparatus unit of the second nozzles 9, 49 on the kind of forming mold to which the formation steps are to be applied, is delayed relative to the information given to the apparatus unit of the first nozzles 8, 46. The information on the kind of forming mold is relayed from the apparatus unit for the previous step to the other apparatus unit for the subsequent step in sequence after completion of the previous step.

The temperature-adjusting device 10 is provided on the returning passage 13b, and preferably in a connection position of the returning passage 13b with the lifter 14a for lifting the forming mold 2. The temperature-adjusting device 10, which is provided on the returning passage 13b, provides a system in which temperature of the forming mold 2 has been properly adjusted before the forming mold 2 enters the inlet of the traveling passage 13a. This makes it possible to make a temperature adjustment of the forming mold 2 during its non-service period of time, i.e., when the forming mold 2 does not contribute to the formation of the lens sheet, thus preventing the length of the conveying device 13 for the forming molds 2 from being lengthen unnecessarily. The temperature-adjusting device 10 has a chamber 10a for surrounding the forming mold 2, which stops once returning on the returning passage 13b. Dried vapor, hot air 6 heated by an electric heater or the like is supplied into the chamber 10a. The hot air 6, which is blown from the bottom of the chamber onto the forming mold 2 heats it to a suitable temperature for formation of the lens sheet. The forming mold 2 is kept in a stand-by state on the returning passage 13b until it is received by the lifter 14a for lifting the forming mold 2. The forming mold 2 is heated to a suitable temperature during such a stand-by state.

The first nozzles 8, 46 are prepared for example for the forming molds 2, which are different from each other in size, respectively. The first nozzles 8, 46 are disposed in the vicinity of the inlet of the traveling passage 13a of the conveying device 13, as shown in FIGS. 5 and 6.

Figure 7:
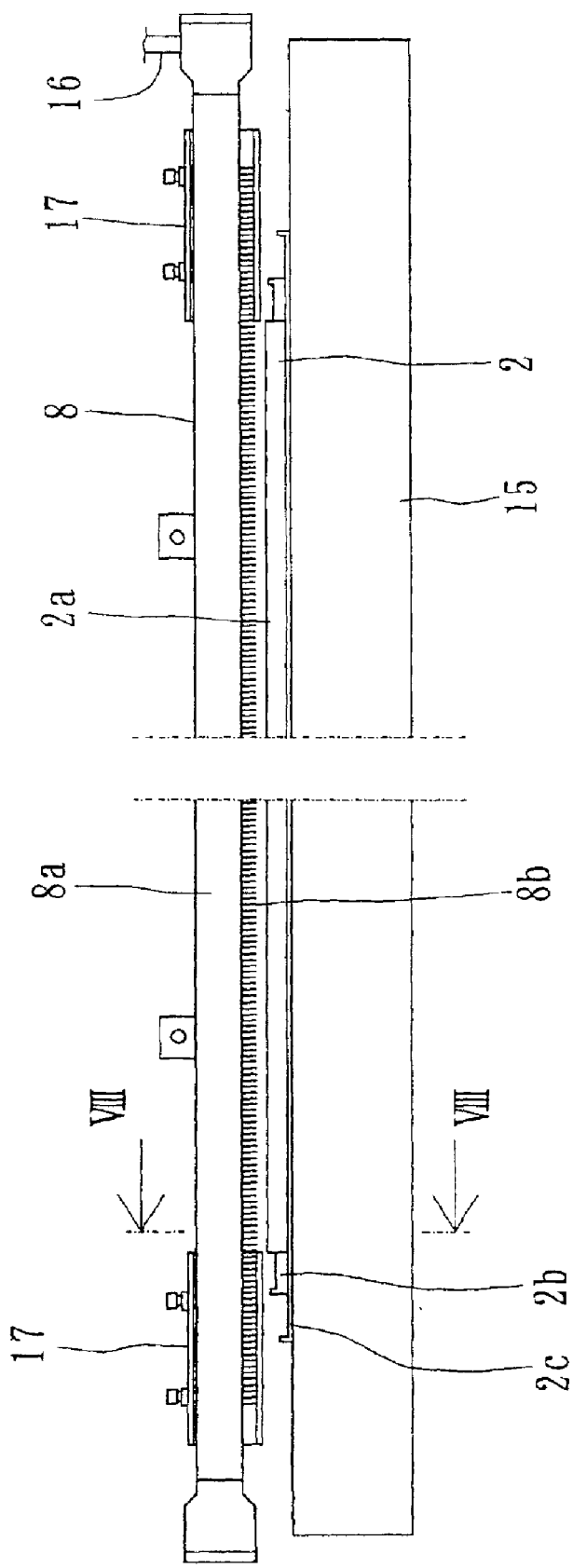
FIG. 7 is a descriptive view of the lens sheet manufacturing apparatus, having a viewing direction based on the line VII—VII in FIG. 5.
Figure 8:
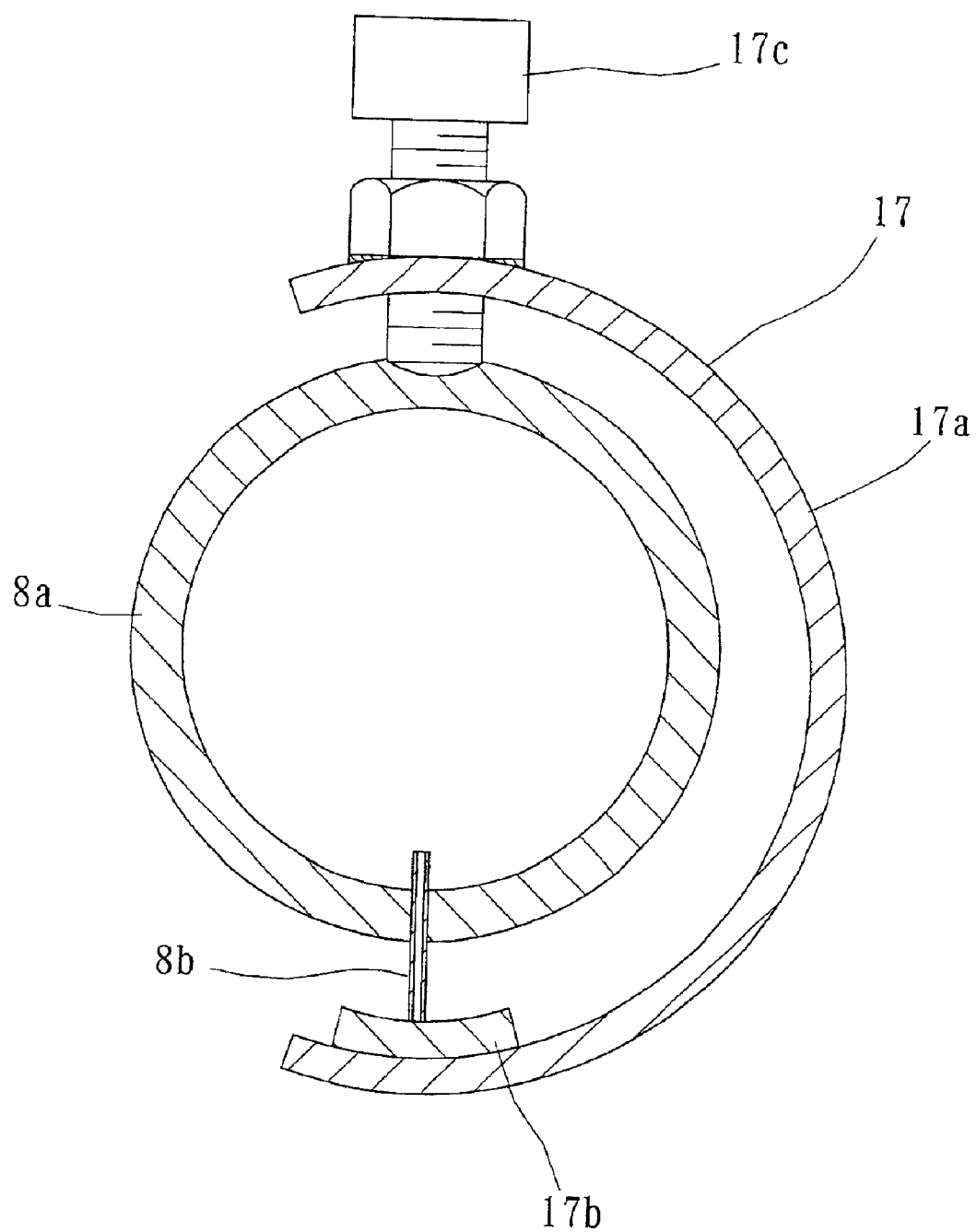
FIG. 8 is a cross-sectional view cut along the line VIII—VIII in FIG. 7.

More specifically, there is used as the first nozzles 8, 46 a multiple nozzle, which has a structure as shown in FIGS. 7 and 8. The reference numeral "15" in FIG. 7 denotes the conveyer roller of the traveling passage 13. The multiple nozzle 8 is provided with a main pipe 8a, which is disposed horizontally in the transverse direction of the traveling passage 13a, and with a plurality of nozzle pipes 8b, which are disposed at regular intervals on a single line on the lower surface of the main pipe 8a. The main pipe 8a has the opposite closed ends. A supply conduit 19 for supplying the ionizing radiation curing type liquid resin is connected to a prescribed portion of the main pipe 8a. The nozzle pipes are formed of an elongated small-diameter pipe made of stainless steel and pass through the wall of the main pipe 8a and are secured thereto by means of press fitting. The ionizing radiation curing type liquid resin 3 supplied into the main pipe 8a is poured simultaneously from the tip ends of the nozzle pipes 8b, which are disposed in a line, and applied onto the forming mold 2, which travels below the nozzle pipes 8b or stops traveling.

There are normally prepared the plurality of forming molds 2 having the different dimensions in accordance with the size of the lens sheets 1 to be manufactured. There may however be prepared the first nozzles 8, 46, which provide different application widths of the ionizing radiation curing type resin, coping with the sizes of the forming molds 2. Alternatively, a plurality of main pipes 8a having the same opening width for the ionizing radiation curing type resin may be prepared and a pair of adjusting devices 17 as shown in FIGS. 7 and 8 may be provided on the opposite sides of each of the main pipes 8*a* so as to adjust an application width of the ionizing radiation curing type resin 3 in accordance with the width of the forming mold 2. Each of the adjusting devices 17 includes a supporting plate 17*a*, which curves so as to partially surround the main pipe 8*a*, a closing plate 17*b* made of flexible material such as rubber, which is secured on the inner surface of the supporting plate 17*a*, and a set screw 17*c* for holding stationarily the supporting plate 17*a* on the main pipe 8*a*. The supporting plate 17*a* is fitted on the main pipe 8*a* so that the closing plate 17*b* comes into contact with the tip ends of the nozzle pipes 8*b*. In such a state, the setscrew 17*c* is tighten so that the tip end of the setscrew 17*c* is urged against the outer surface of the main pipe 8*a*. The supporting plate 17*a* is stationarily secured on the main pipe 8*a* so that the tip ends of the nozzle pipes 8*b*, which are located outside the forming mold 2, are closed by the closing plate 17*b*, thereby adjusting an application width of the ionizing radiation cured type resin 3. Change in securing position of the adjusting device 17 on the main pipe 8*a* in an appropriate manner makes it possible to change the number of the nozzle pipes 8*b*, which are to be closed. However, there may previously be prepared the plurality of adjusting devices 17 having the different lengths to each other. In this case, selection of an appropriate one of these adjusting devices 17 makes it possible to change the number of the nozzle pipes 8*b*, which are to be closed, thereby adjusting an application width of the ionizing radiation cured type resin 3.

A single nozzle may be used in place of the multiple nozzle serving as the first nozzles 8, 46. The single nozzle may be moved in a perpendicular direction to the traveling direction of the forming mold 2 according to the width of the forming mold 2 so that the ionizing radiation curing type resin is applied onto the forming mold 2.

Figure 9:
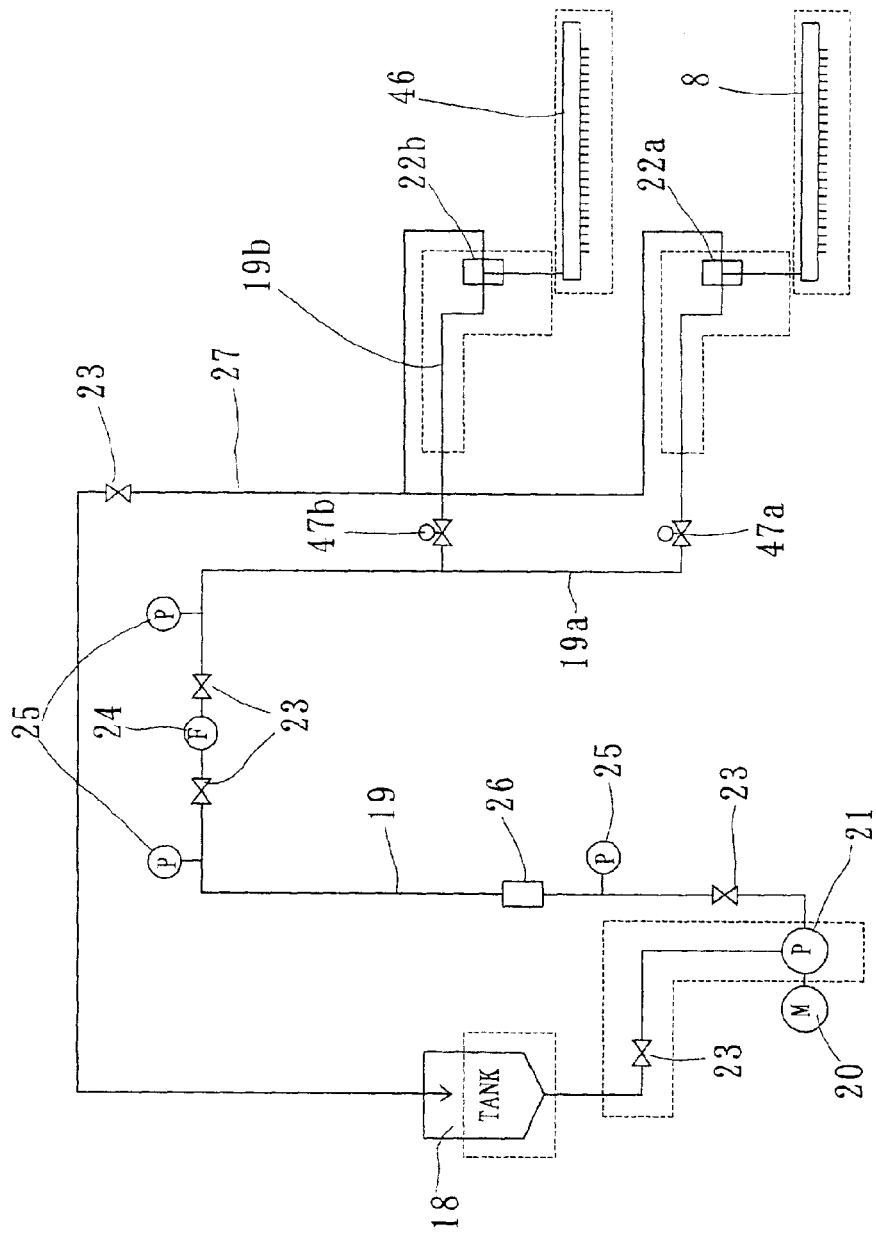
FIG. 9 is a view illustrating a piping system in a device for supplying ionizing radiation curing type resin.

Supply of the ionizing radiation curing type liquid resin 3 into the first nozzles 8, 46 is conducted by a piping as shown in FIG. 9. In FIG. 9, a reference numeral "18" denotes a reservoir tank 18 for the ionizing radiation curing type liquid resin 3. A supply conduit 19 for the ionizing radiation curing type liquid resin 3 extends from the reservoir tank 18 to the two first nozzles 8 46. The supply conduit 19 branches off at its middle portion into two sub-conduits 19*a*, 19*b*, which are connected to the nozzles 8, 46, respectively. The supply conduit 19 is provided with a pump 21 driven by a gear motor 20, a manual valve 23, a filter 24, a pressure gauge 25, a flow meter 26 and the like. The branch sub-conduits 19*a*, 19*b* are provided with discharge valves 22*a*, 22*b* serving as three way valves for permitting connection of the source of the ionizing radiation curing type resin 3 with the first nozzles 8, 46 to supply the resin 3 into the first nozzles 8, 46, respectively, or disconnection thereof. Driving of the pump 21 causes the ionizing radiation curing type resin 3 received in the reservoir tank 18 to flow in the supply conduits 19, 19*a*, 19*b* toward the discharge valves 22*a*, 22*b*. When the forming mold 2 is moved in a prescribed position, the discharge valve 22*a* or 22*b* is opened so that the ionizing radiation curing type resin 3 flows into the main pipe 8*a* of the first nozzles 8 or 46. As a result, the ionizing radiation curing type resin 3 is poured onto the forming mold 2. A return conduit 27 extends from the discharge valves 22*a*, 22*b* to the reservoir tank 18. In a state where the resin is not poured, the discharge valves 22*a*, 22*b* close the supply conduits 19*a*, 19*b* communicating with the first nozzles 8, 46, respectively and simultaneously connects the supply conduit 19*a*, 19*b* to the return conduit 27. Accordingly, the ionizing radiation curing type resin flowing in the supply conduits 19, 19*a*, 19*b* passes through the return conduit 27 and returns into the reservoir tank 18, thus performing circulation between the supply conduits 19, 19*a*, 19*b* and the return conduit 27. In addition, the supply conduits 19*a*, 19*b* are provided with automatic valves 47*a*, 47*b*, respectively. When the ionizing radiation curing type resin 3 is supplied to the forming mold 2 having a certain size, it is unnecessary to supply the ionizing radiation curing type resin 3 to the other forming mold 2 having the different size. Accordingly, one of the automatic valves 47*a*, 47*b* is opened and the other of them is closed.

An opening or closing control of the discharge valves 22*a*, 22*b* and the automatic valves 47*a*, 47*b* starts for example with identification of the size of the forming mold 2 by the proximity sensor 48 or with identification of the kind of forming mold 2 based on the preset system. Completion of identification of the kind of forming mold 2 causes the discharge valves 22*a*, 22*b* and the automatic valves 47*a*, 47*b* to be switched. A discharge-starting timer (not shown) starts to operate. The discharge-starting timer is provided for each of the kinds of forming molds. When the kind of forming mold 2 is identified, a signal is sent to the corresponding discharge-starting timer. The discharge-starting timer measures a period of time ranging from the time when the kind of forming mold 2 is identified to the time when the front end of the forming mold 2, which travels at a prescribed velocity on the traveling passage 13*a* of the endless conveying device 13, reaches a position below the nozzle 8 or 46. When the front end of the forming mold 2 reaches the position below the nozzle 8 or 6 and the measurement of the period of time by the discharge-starting timer is completed, the discharge valve 22*a* or 22*b* corresponding to the automatic valve 47*a* or 47*b*, which has already been opened, is also opened to discharge the ionizing radiation curing type resin 3 from the nozzle 8 or 46. The forming mold 2 may be stopped traveling on the traveling passage 13*a*, when the front end of the forming mold 2 reaches the position below the nozzle 8 or 6.

A not-shown discharging-finishing timer controls discharging-finishing time of the ionizing radiation curing type resin 3. The discharging-finishing timer is prepared for each of the kinds of forming molds. The discharging-finishing timer measures a period of time ranging from the time when the discharging-starting timer stops measurement to the time when the each of the forming molds 2 passes through below the nozzle 8 or 46. When the forming mold as identified passes through below the nozzle 8 or 46, the discharging valve 22*a* or 22*b* closes to stop discharge of the ionizing radiation curing type resin from the nozzle 8 or 46.

The ionizing radiation curing type resin 3 is applied on each of the forming molds 2 by a required width and length of application in accordance with the size of the respective forming molds 2.

Figure 10:
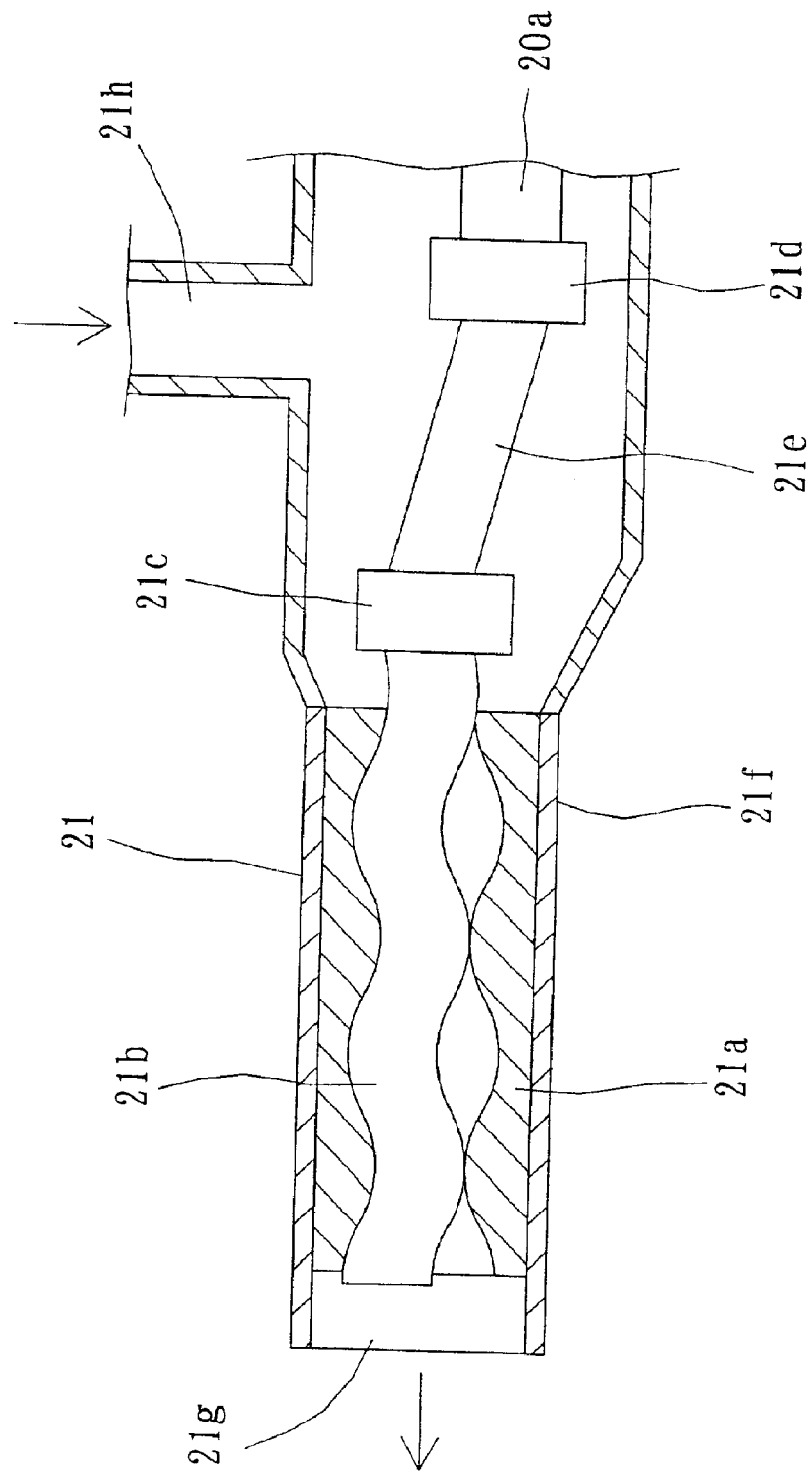
FIG. 10 is a cross-sectional view illustrating a pump in the device for supplying the ionizing radiation curing type resin.

A displacement type-single eccentric shaft screw pump as shown in FIG. 10, which is so called "snake pump", is used as the above-mentioned pump 21. The snake pump includes a stator 21*a*, which is made of resilient material and has a central through-hole with a elliptic cross section, a spiral-shaped rotor 21*b* inserted into the stator 21*a*, two universal joints 21*c*, 21*d* provided between the rotor 21*b* and an output shaft 20*a* of a gear motor 20, and a coupling rod 21*e*. A housing 21*f* of the pump 21 is provided at its portion in which the stator 21*a* is received, with a discharge port 21*g* connected with the supply conduit 19. The housing 21*f* is provided at its portion in which the universal joints and the other structural components are received, with a suction port 21h. The ionizing radiation curing type resin 3 received in the reservoir tank 18 is sucked from the suction port 21h into the stator 21a and supplied from the discharge port 21g to the discharge valve 22. Pulsation does not easily occur in such a snake pump. Accordingly, the ionizing radiation curing type resin 3 can be discharged at a constant flow rate from the nozzle pipes 8b. The ionizing radiation curing type resin 3 can be applied on the forming mold 2 to form the layer having a uniform thickness. The snake pump imparts almost no shearing force to the ionizing radiation curing type resin 3, thus permitting to apply the resin onto the forming mold 2 without deterioration of the resin.

An amount of the ionizing radiation curing type resin 3 discharged from the nozzle 8 or 46 differs depending upon the size of the forming mold 2. It is therefore necessary to change the amount of resin 3 discharged from the discharge port 21g of the pump 21 in accordance with the kind of forming mold 2. Accordingly, the number of rotations of the gear motor 20 for driving the pump 21 is controlled so as to be switchable for example in accordance with the signal form the above-described proximity sensor for identifying the kind of forming mold 2. Consequently, when the forming mold 2 having a large size reaches the nozzle 8 or 46, the pump 21 operates at an increased number of rotations to supply a large amount of ionizing radiation curing type resin 3 on the above-mentioned forming mold 2. When the forming mold having a small size reaches the nozzle 8 or 46, the pump 21 operates, on the other hand, at a decreased number of rotations to supply a small amount of ionizing radiation curing type resin 3 on the above-mentioned forming mold 2.

The second nozzle 9 and 49 are provided on the downstream side of the first nozzles 8 and 46 on the traveling passage of the conveying device 13. The second nozzles 9 and 49 may have the same structure as the first nozzles 8 and 46. Supply of the ionizing radiation curing type resin to the second nozzles 9 and 49 may be performed by causing the conduit of the piping for the ionizing radiation curing type resin supplied to the first nozzles 8 and 46 to branch off.

The ionizing radiation curing type liquid resin is applied from the second nozzle 9 or 49 on the pressing-starting side of the first uncured layer, which has been applied on the forming mold 2, to form an uncured resin pool. The switching operation of an application width and amount of the ionizing radiation curing type resin 3 with the use of the second nozzle 9 or 49 is carried out in the same manner as the first nozzle 8 or 46. For example, a proximity sensor 48a, which is disposed on the upstream side of the second nozzles 9 and 49, identifies the kind of forming mold 2 to carry out a switching operation of the second nozzles 9 and 49 to discharge the ionizing radiation curing type resin.

The second nozzles 9 and 49 may be omitted, as an occasion demands. In such a case, there may be adopted an application system in which the ionizing radiation curing type resin 3 is applied onto the forming mold 2 by the first nozzle 8 or 46 to form the first uncured layer, and then the forming mold 2 is moved backward, and finally the ionizing radiation curing type resin 3 is applied on the one side of the first uncured layer by the first nozzle 8 or 46 to form an uncured resin pool.

Portions of the supply device for the ionizing radiation curing type resin, which are defined by dotted lines in FIG. 9, are heated by heaters in the shape of ribbon. More specifically, heating the reservoir tank 18, the pump 21, the discharge valves 22a, 22b and the nozzles 8, 46 in an appropriate manner cases the ionizing radiation curing type resin to be poured smoothly from the first and second nozzles 8, 46, 9, 49. In addition, subjecting the ionizing radiation curing type resin 3 and the forming mold 2 to the respective temperature adjustments makes it possible to enhance formability of the ionizing radiation curing type resin 3.

Figure 11:
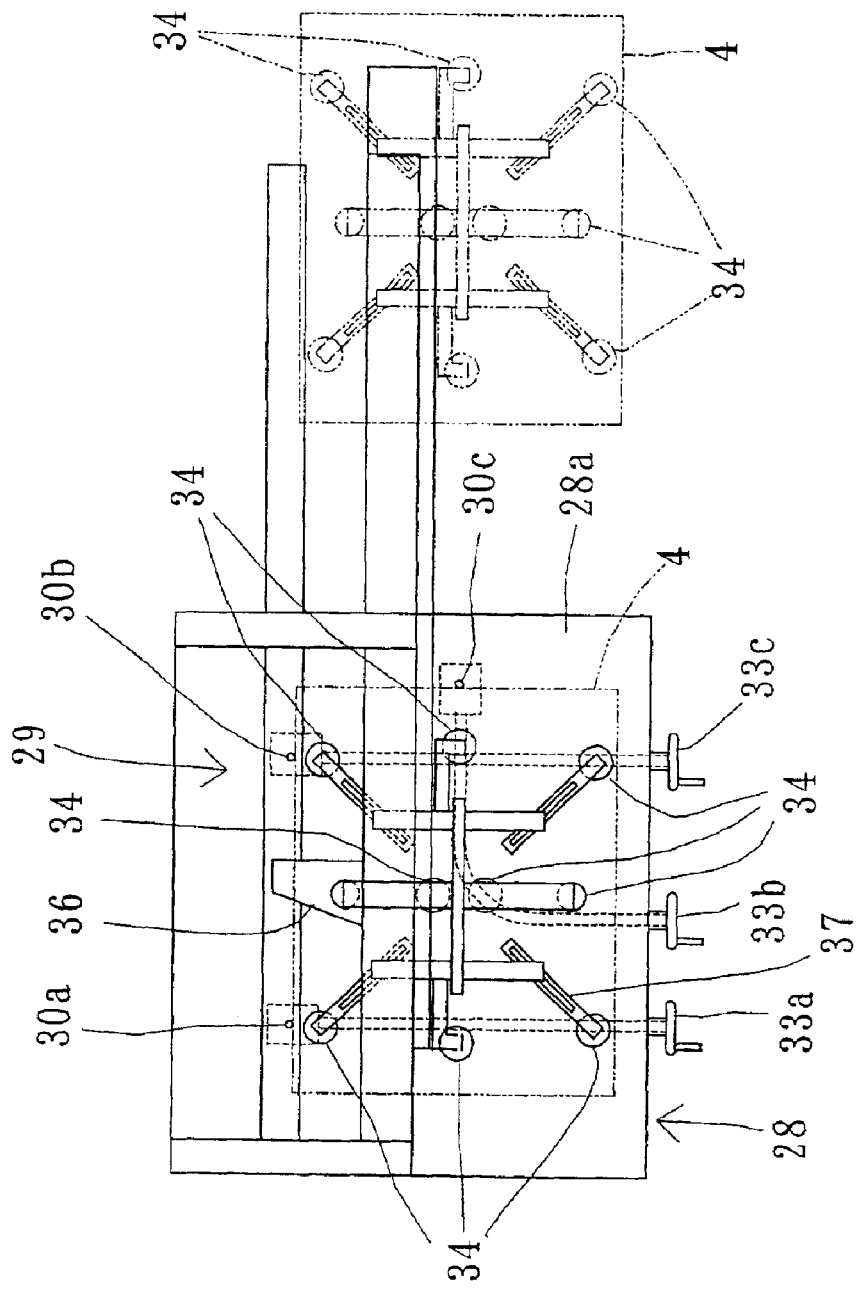
FIG. 11 is a plan view of a substrate supply device.
Figure 12:
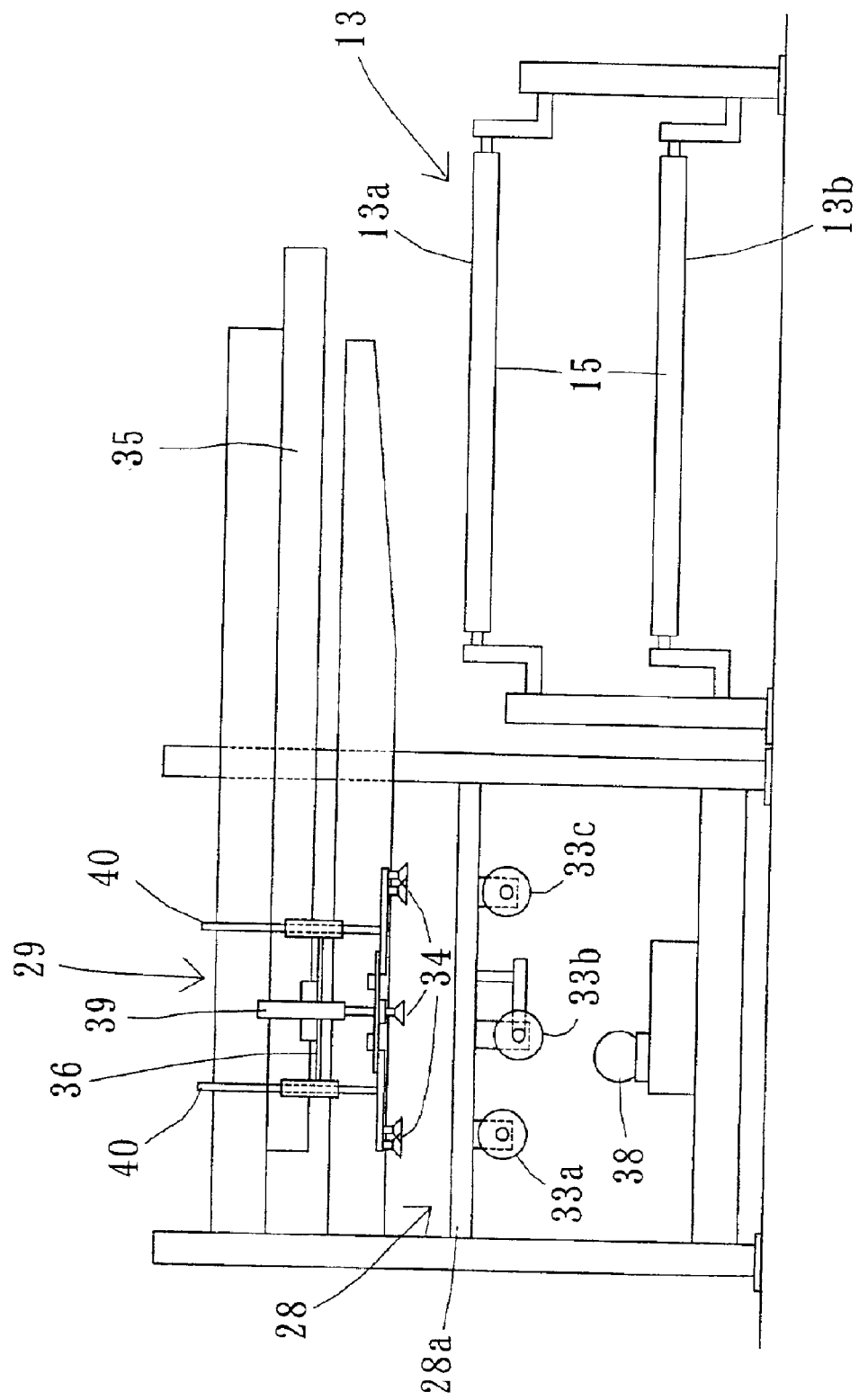
FIG. 12 is a front view of the substrate supply device, having a viewing direction based on the line XII—XII in FIG. 5.
Figure 13:
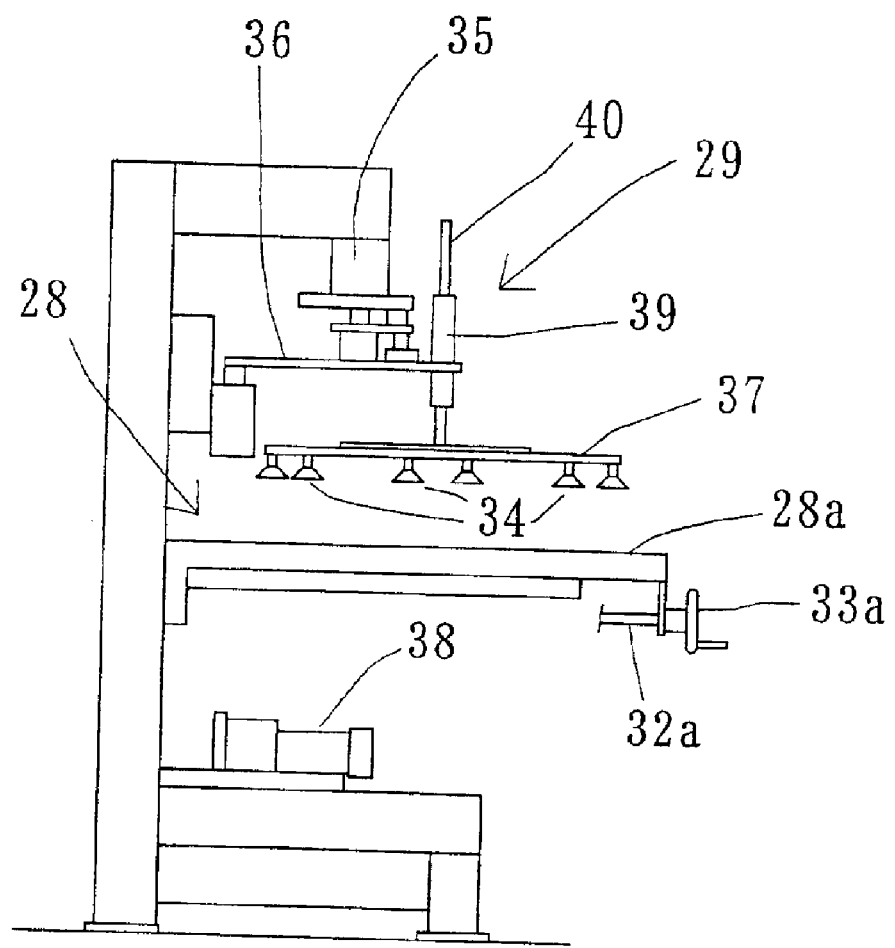
FIG. 13 is a left-hand side view of the substrate supply device.
Figure 15:
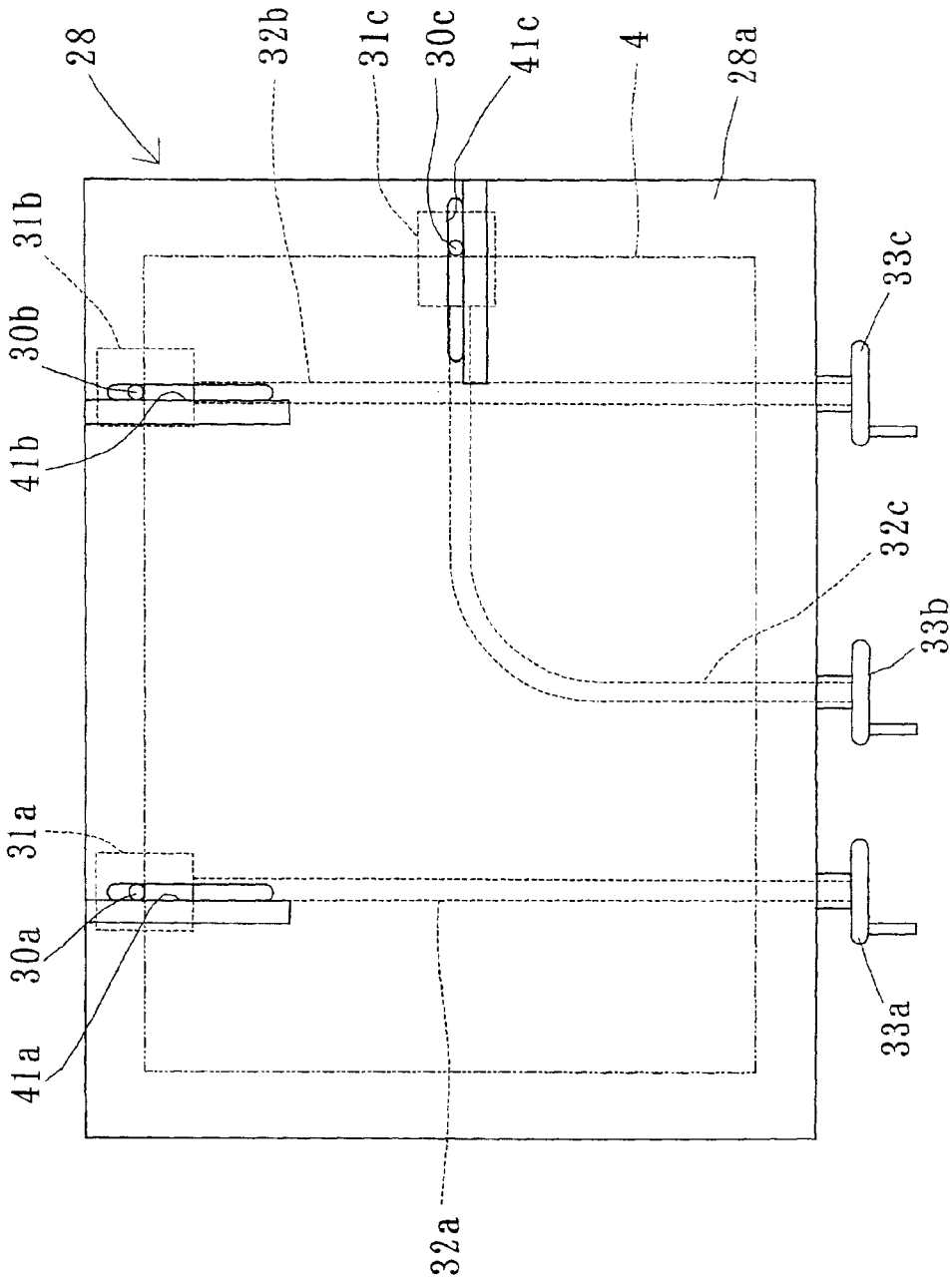
FIG. 15 is a plan view illustrating a positional determination table of the substrate supply device.

The substrate supply device 11 is provided on the downstream side of the second nozzles 9, 49 on the traveling passage 13a of the conveying device 13. The substrate supply device 11 includes a table 28 for making a positional determination of the substrate 4 and a substrate-conveying device 29, which moves reciprocally between the table 28 and the forming mold 2 on the traveling passage 13a, as shown in FIGS. 11 and 15.

The positional determination table 28 is disposed along the one side of the conveying device 13 so that the one side of the table 28 extends in parallel to the traveling direction of the forming mold 2. The positional determination table 28 is provided with a top board 28a having a horizontal plane on which the substrate 4 is placed. Three pins 30a, 30b, 30c, which make a positional determination, project upward from the horizontal plane. Sliders 31a, 31b, 31c for respectively supporting the three pins 30a, 30b, 30c through air cylinders (not shown) are disposed below the top board 28a of the positional determination table 28. Of the three pins 30a, 30b, 30c, two pins 30a, 30b are disposed along one side of the top board 28a. The sliders 31a, 31b for respectively supporting these pins 30a, 30b are disposed within the positional determination table 28 so as to be slidable in the perpendicular direction to the above-mentioned one side of the top board 28a. The remaining pin 30c is disposed along the other side of the top board 28a, which is perpendicular to the above-mentioned one side thereof. The slider 31c for supporting the pin 30c is disposed in the positional within the positional determination table 28 so as to be slidable in the perpendicular direction to the above-mentioned other side of the top board 28a. The positional determination table 28 has slots 41a, 41b, 41c formed thereon, which extend in the sliding directions of the sliders 31a, 31b, 31c. The pins 30a, 30b, 30c pass through the slots 41a, 41b, 41c, respectively. The sliders 31a, 31b, 31c are engaged with tip end portions of screw shafts 32a, 32b, 32c, respectively, which are rotatably supported in the positional determination table 28. The screw shafts 32a, 32b, 32c are provided at their rear ends with handles 33a, 33b, 33c, respectively. The screw shaft 32c is provided at its middle portion with a flexible joint. Rotating the screw shafts 32a, 32b, 32c with the use of the handles 33a, 33b, 33c causes the sliders 31a, 31b, 31c to slide within the positional determination table 28 so that the pins 30a, 30b, 30c move along the slots 41a, 41b, 41c, respectively. The above-mentioned operations make it possible to change the positions of the pins 30a, 30b, 30c in accordance with the size of the substrate 4 and make a fine adjustment of positions of them.

There may be a case where the pins 30a, 30b, 30c are not used due to the size of the substrate 4. In such a case, the pins 30a, 30b, 30c are moved down below the horizontal plane under the function of the air cylinders (not shown). The size of the substrate 4 and the size of the forming mold 2 differ in accordance with the size of the lens sheet to be manufactured. When the size of the substrate 4 is too large to utilize the pins 30a, 30b, 30c for making the positional determination, an ON/OFF operation of the air cylinder is carried out on the basis of the signal from the above-mentioned proximity sensor 48 for identifying the kind of forming mold 2 so that the pins 30a, 30b, 30c are moved down below the horizontal plane.

The substrate 4 is placed on the positional determination table 28 one by one so that the adjacent two sides of the substrate 4 come into contact with the pins 30a, 30b, 30c to make a positional determination. In such a state, extending lines of a pair of opposite sides of the substrate 4 coincide with the vertical plane including a pair of opposite sides of the forming mold 2, which stops traveling on the conveying device 13.

When the pins 30a, 30b, 30c are moved down below the horizontal plane of the table 28, the positional determination of the substrate 4 is made by bring the substrate 4 into contact with pins, which are provided on the different positions of the table 28 so as to be non-retractable. The fine positional adjustment of each of the above-mentioned pins can however be made.

Figure 14:
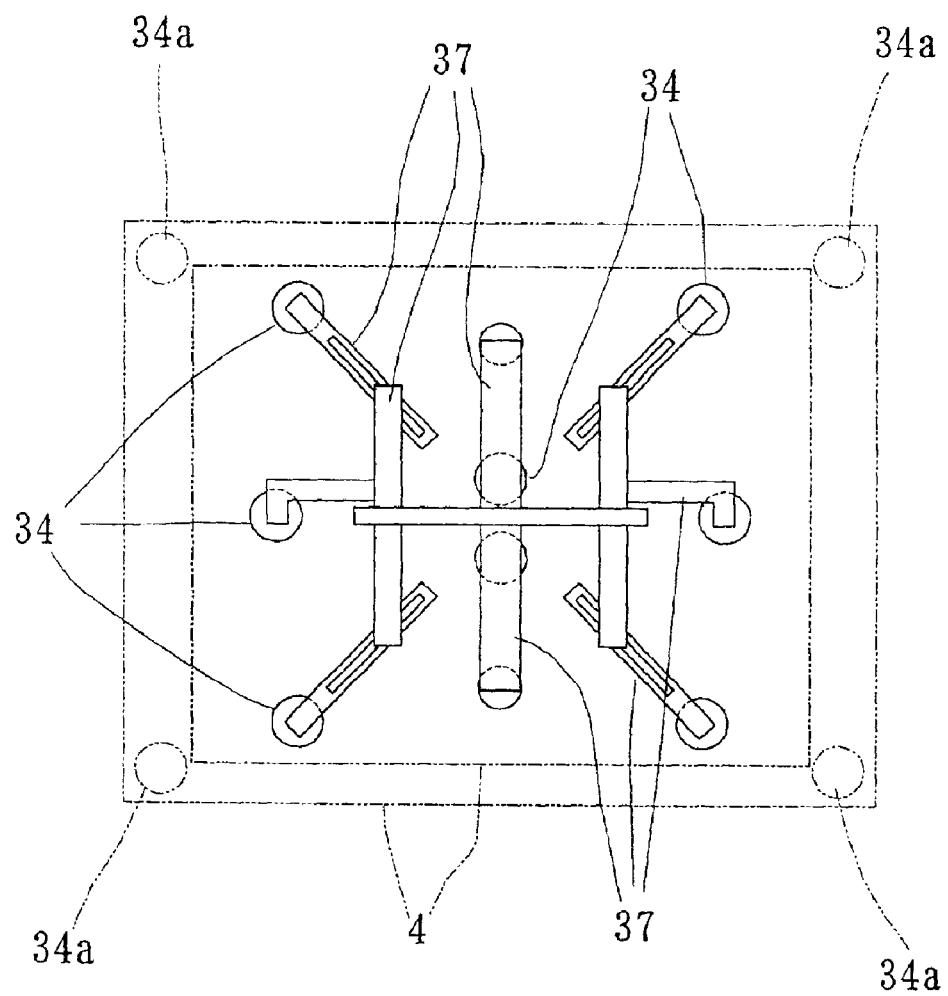
FIG. 14 is a plan view illustrating a suction member of the substrate supply device.

The substrate-conveying device 29 includes a substrate-suction member and a moving member. The substrate-suction member has on its horizontal plane a plurality of suction cups 34. The moving member reciprocally moves the substrate-suction member between the positional determination table 28 and the forming mold 2 on the traveling passage 13a of the conveying device 13. The moving member includes a rail 35, which extends from a position above the positional determination table 28 to the other position above the traveling passage 13a of the conveying device 13 in a direction perpendicular to the traveling direction of the forming mold 2, an arm 36, which is capable of traveling on the rail 35, and a driving unit for driving the arm 36 on the rail 35. The driving unit is composed of a linear motor, an air cylinder or the like. The substrate-suction member has a plurality of bar-shaped members 37, which are disposed on the horizontal plane and connected to each other, and a plurality of suction cups 34, which are secured to the bar-shaped members 37. The suction cups 34 are disposed in places, which correspond to the central portion of the substrate 4, and in places, which correspond to the peripheral portions of the substrate 4, as shown in FIG. 14. Additional suction cups 34a as shown in two-dot chain lines are provided so as to permit to suck a substrate 4 having a larger size, as an occasion demands. The substrate-suction member is connected to the front end of the arm 36 through an air cylinder 39, which is disposed in a vertical direction, and a guide rod 40.

A switching operation of connection of the suction cups 34, 34a, which are disposed on the two peripheral areas, respectively, to the vacuum pump 38 is made in accordance with the size of the substrate 4 to be sucked. Such a switching operation of connection is conducted on the basis of the signal from the above-mentioned identification device such as the proximity sensor 48 for identifying the kind of forming mold 2. As a result, when the substrate 4 has a small size, the suction cups 34a are disconnected from the vacuum pump 38. When the substrate 4 has a large size, the suction cups 34a are connected to the vacuum pump 38.

The substrate-suction member of the substrate-conveying device 29 moves up and down relative to the positional determination table 28 under operation of the air cylinder 39 so as to suck the substrate 4, which has been placed in a prescribed position on the positional determination table 28, and lift it up. The moving member of the substrate-conveying device 29 carries the substrate-suction member, by which the substrate 4 has been sucked, to a position just above the forming mold 2, which temporarily stops traveling on the conveying device 13. Then, the air cylinder 38 is operated to move down the substrate-suction member toward the forming mold 2 and then move it up. When the substrate-suction member descends toward the forming mold 2, the suction of the substrate 4 is released so as to drop the substrate 4 onto the forming mold 2. The substrate 4 is placed on the ionizing radiation curing type resin 3 applied on the forming mold 2. Then, the substrate-suction member is carried again to the positional determination table 28 along the rail 35.

Figure 16:
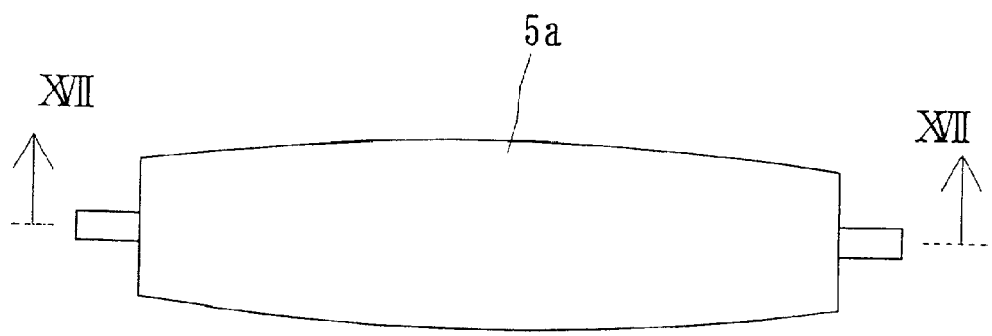
FIG. 16 is a front view of a pressing roller.
Figure 17:
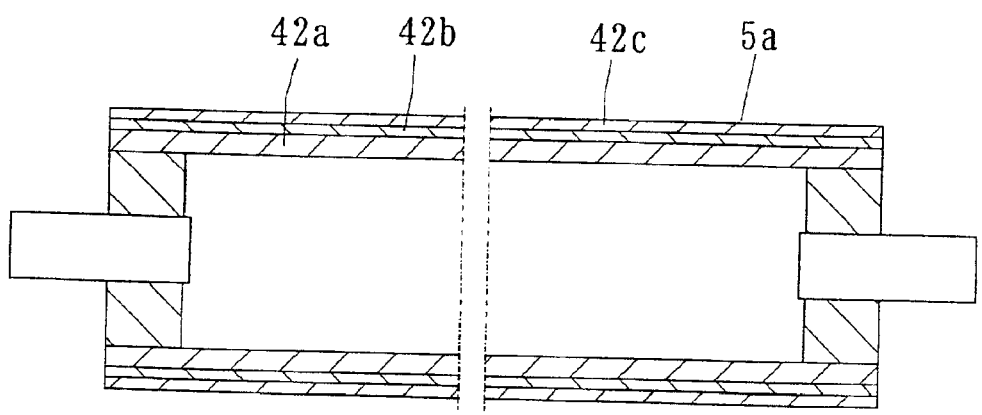
FIG. 17 is a cross-sectional view cut along the line XVII—XVII in FIG. 16.

The pressing rollers 5a, 5b are disposed on the downstream side of the substrate supply device 11 on the traveling passage 13a of the conveying device 13. The pressing rollers 5a, 5b are disposed so that the traveling passage 13a is placed between the pressing rollers 5a, 5b in the vertical direction. The lower roller 5b, which comes into contact with the lower surface of the forming mold 2, is formed of metal into a cylindrical shape. The upper roller 5a, which comes into contact with the substrate 4, which has been placed on the forming mold 2, is provided with a crown, as shown in FIG. 16. The upper roller 5a has a three-layer structure as shown in FIG. 17, which is composed of an innermost layer 42a formed of a cylindrical metallic pipe, an intermediate layer 42b made of rubber and an outermost layer 42c made of sponge. The outermost layer 42c made of sponge forms the above-mentioned crown. The intermediate layer made of rubber may be omitted. The upper roller 5a is moved up and down by means of an air cylinder (not shown).

When the forming mold 2 travels on the traveling passage 13a of the conveying device 13, the upper roller 5a descends under the function of the air cylinder so that the front portions of the forming mold 2 and the substrate 4 are held between the upper roller 5a and the lower roller 5b. Both the upper and lower rollers 5a, 5b roll to move the forming mold 2 in one direction. Accordingly, the ionizing radiation curing type resin 3 is spread through the substrate 4 so as to be flattened.

The set value of the pressing force applied by the pressing rollers 5a, 5b must be changed in accordance with the sizes of the substrate 4 and the forming mold2 and the thickness of the substrate 4. Change in set value of the pressing force is made by carrying out a switching operation of a pressure regulator for air cylinders (not shown) for moving up and down the lower pressing roller 5a. The pressure regulator is controlled so that judgment by the identification device such as the proximity sensor 48 that a large pressing force must be applied to the forming mold 2, increase air pressure applied to the above-mentioned air cylinders, on the one hand, and judgment thereby that a small pressing force must be applied to the forming mold 2, decrease air pressure applied to the above-mentioned air cylinders, on the other hand. Such a pressure control system ensures that the substrate can be pressed by an appropriate pressing force so as to flatten uniformly the ionizing radiation curing type resin 3 on the respective forming molds 2 without causing occurrence of unevenness.

A not-shown pressing-starting timer and pressing finishing timer control the start and finish of the pressing operation conducted by the pressing rollers 5a, 5b, respectively. The pressing-starting timer and pressing-finishing timer are provided for each of the kinds of forming molds. When the identification device identifies the kind of forming mold, the corresponding pressing-starting timer measures a period of time ranging from the time when the kind of forming mold 2 is identified to the time when the pressing-starting side of the forming mold reaches a position between the pressing rollers 5a, 5b. After completion of such measurement, the air cylinder moves down the upper pressing roller 5a toward the forming mold 2. The pressing-finishing timer measures a period of time ranging from the time when the pressing-starting side of the forming mold 2 reaches the position between the pressing rollers 5a, 5b to the time when the pressing-finishing side of the forming mold 2 passes through between them. After completion of such measurement, the air cylinder moves up the upper pressing roller 5a.

The ionizing radiation irradiating device 12, which is composed of a ultraviolet lamp or the like, is disposed on the downstream side of the pressing rollers 5a, 5b on the traveling passage 13a of the conveying device 13. Ionizing radiation 7, which is irradiated on the ionizing radiation curing type resin 3 through the substrate 4 from the ionizing radiation irradiating device 12, cures the ionizing radiation curing type resin 3. When the forming mold 2 is carried on the filter 14b and stands in a non-moving state, the ionizing radiation curing type resin 3, which has been cured by irradiation of the ionizing radiation 7, is peeled from the forming mold 2 by a manual operation.

Now, description will be given below of a series of operations of the above-described apparatus for manufacturing lens sheets.

Driving the conveying device 13 circulates the forming molds 2 in the apparatus for manufacturing lens sheets.

The temperature-adjusting device 10 carries out temperature adjustment of the forming mold 2, which is out of an actual formation of the lens sheet and temporarily stops traveling before the returning lifter 14a.

The first nozzle 8 or 46 applies the ionizing radiation curing type resin in the form of liquid on the entirety of the upper surface of the forming mold 2, which has been subjected to the temperature adjustment, to form the first uncured resin layer on the inlet portion of the traveling passage 13a of the conveying device 13. Switching operation is made in accordance with the kind of forming mold 2 to use selectively any one of the first nozzles 8, 46.

The ionizing radiation curing type resin 3, which circulates in the piping, is poured from the first nozzle 8 or 46, when the forming mold 2 moves below the first nozzle 8 or 46 and the discharge valve 22a or 22b is opened. The forming mold 2 travels at a constant speed below the first nozzle 8 or 46 so that the ionizing radiation curing type resin 3 is applied from the first nozzle 8 or 46 on the forming mold 2 in a constant thickness. The timer controls the discharging period of time during which the ionizing radiation curing type resin 3 is applied by means of the first nozzle 8 or 46.

The second nozzle 9 or 49 applies the ionizing radiation curing type resin 3 in the form of liquid on one side, i.e., the pressing-starting side of the first uncured layer formed on the forming mold 2, on the downstream side of the first nozzle 8 or 46 to form an uncured resin pool on the first uncured layer. Application of the ionizing radiation curing type resin 3 through the second nozzle 9 or 49 is carried out after the operation of the traveling passage 13a of the conveying device 13 is temporarily stopped to keep the forming mold 2 in a non-moving state. The above-mentioned application may be carried out, while continuously operating the traveling passage 13a to travel the forming mold 2.

The forming mold 2 on which the first uncured layer and the uncured resin pool have been formed, is carried to a position of the substrate supply device 11 by the traveling passage 13a of the conveying device 13. The forming mold 2 temporarily stops traveling immediately after it reaches to the above-mentioned position. The substrate-supply device 11 carries the substrate 4, which has dimensions corresponding to the size of the forming mold2, above the forming mold 2 and drops it thereon.

The position of the substrate 4 is previously determined on the positional determination table 28 so as to coincide with the position of the forming mold 2.

After the substrate 4 is placed on the first uncured layer and the uncured resin pool of the ionizing radiation curing type resin 3, which have been applied on the forming mold 2, the traveling passage 13a of the conveying device 13 carries the forming mold 2 to the pressing rollers 5a, 5b. When the forming mold 2 travels on the traveling passage 13a of the conveying device 13 to a prescribed position, the upper roller 5a descends so that the front portion, i.e., the pressing-starting end of the forming mold 2 is held between the upper and lower rollers 5a, 5b. The pressing force applied by the pressing rollers 5a, 5b is appropriately changed in accordance with the kind of forming mold 2. Both the upper and lower rollers 5a, 5b roll to move the forming mold 2 in one direction. Accordingly, the uncured resin pool is spread on the first uncured layer through the substrate 4 to be flattened, thus forming the second uncured layer on the first resin layer. The first and second uncured layers are actually combined into a single united layer.

The traveling passage 13a of the conveying device 13 carries the forming mold 2, which has passed between the pressing rollers 5a, 5b, to the ionizing radiation irradiating device 12. The forming mold 2 passes below the ionizing radiation irradiating device 12. The forming mold 3 may temporarily stop traveling below the ionizing radiation irradiating device 12. The ionizing radiation irradiating device 12 irradiates ionizing radiation 7 on the first and second layers of the ionizing radiation curing type resin 3 through the substrate 4 to cure them.

The traveling passage 13a of the conveying device 13 carries the forming mold 2 on the lifter 14b. When the forming mold 2 is carried on the filter 14b and stands in a non-moving state, the ionizing radiation curing type resin 3, which has been cured by irradiation of the ionizing radiation 7, i.e., a lens sheet as a semi-finished product is peeled from the forming mold 2 by a manual operation.

Then, the forming mold 2 from which the semi-finished product has been removed is returned to a position of the temperature-adjusting device 10 by the operation of the returning passage 13b. The forming mold 2 is then subjected to the temperature adjustment through the temperature-adjusting device 10 and then returned again to the traveling passage 13a so that it can be used for the next formation of the lens sheet.

In the above-described embodiment of the present invention, the two kinds of forming molds are used. The present invention may be applicable to a case where three or more kinds of forming molds are used. In actual situation, there are some cases where the forming molds are different from each other in size, the forming molds have the same size each other, but are different from each other in their design, and the forming molds have the same size and design each other, but are different from each other in metallic material due to differences in mold formation methods such as a cutting method, an electroforming method and the like. Consequently, the forming molds as actually used may be called the "different kinds of forming molds" requiring different forming conditions exclusively applied to them.

In the above-described embodiment of the lens sheet manufacturing method of the present invention, the temperature-adjusting step (A) and the first resin-application step (B), which are shown in FIGS. 1(A) to 1(G) may be omitted. More specifically, the lens sheet manufacturing method may comprise a resin-application step (i.e., a partial-surface application step) (A) for applying ionizing radiation curing type resin 3 in the form of liquid on one side, i.e., the pressing-starting side of the forming mold 2 to form an uncured resin pool; a substrate supplying step (B) for placing the substrate 4, through which ionizing radiation permeates, on the uncured resin pool from above the forming mold 2; a laminating step (C) for pressing the substrate 4 and the forming mold 2 from the pressing-starting side toward the pressing-finishing side by means of the pair of pressing rollers 5a, 5b to spread the uncured resin pool over the forming mold 2 so that a superfluous amount of the ionizing radiation curing type resin 3 flows from the periphery of the mold body 2a of the forming mold 2, thereby forming the uncured resin layer on the forming mold 2 so as to provide a laminate structure of the uncured resin layer and the substrate 4; a resin-curing step (D) for irradiating ionizing radiation onto the uncured resin layer through the substrate 4 to cure it; and a removing step (E) for removing the ionizing radiation curing type resin 3 as cured from the forming mold 2 together with the substrate 4, as shown in FIGS. 19(A) to 19(E).

Alternatively, the lens sheet manufacturing method of the present invention may be modified into the method including the steps as shown in FIGS. 20(A) to 20(F). More specifically, the lens sheet manufacturing method may comprise the first resin-application step (i.e., the full-surface application step) (A) for applying ionizing radiation curing type resin 3 in the form of liquid on the entirety of the upper surface of the forming mold 2 to form the first uncured resin layer; the second resin-application step (i.e., the partial-surface application step) (B) for applying the ionizing radiation curing type resin 3 in the form of liquid on the central portion the first uncured layer, which has been applied on the forming mold 2, to form an uncured resin pool; a substrate supplying step (C) for placing the substrate 4, through which ionizing radiation permeates, on the uncured resin pool from above the forming mold 2; a laminating step (D) for pressing the substrate 4 toward the forming mold 2 by means of a surface plate 49 to spread the uncured resin pool over the first uncured resin layer so that a superfluous amount of the ionizing radiation curing type resin 3 flows from the periphery of the mold body 2a of the forming mold 2, thereby forming the second uncured resin layer on the first uncured resin layer so as to provide a laminate structure of the first and second uncured resin layers and the substrate 4; a resin-curing step (E) for irradiating ionizing radiation onto the first and second uncured resin layers through the substrate 4 to cure them; and a removing step (F) for removing the ionizing radiation curing type resin 3 as cured from the forming mold 2 together with the substrate 4.

In the second resin-application step (B), the uncured resin pool is formed into a conical shape or an elongated block-shape on the central portion of the first uncured resin layer.

The laminating step (D), which is to press the substrate 4 toward the ionizing radiation curing type resin 3 and the forming mold 2 to flatten the uncured resin pool to form the second uncured resin layer on the first uncured resin layer, is carried out by applying pressing force to the forming mold 2 on which the first uncured resin layer and the uncured resin pool have been formed and then the substrate has been placed on them, by means of a pair of surface plates 49 (there is not shown the lower surface plate, which may be substituted by the forming mold 2) and pressing the ionizing radiation curing type resin 3 in a prescribed uniform thickness. The uncured resin pool of the ionizing radiation curing type resin is forcedly pressed by the surface plates 49 from the central portion of the first uncured resin layer toward the periphery thereof to flow so as to exclude bubbles from a space between the substrate 4 and the forming mold 2. Accordingly, the second uncured resin layer is formed between the first uncured resin layer and the substrate 4.

Finally, a superfluous amount of the ionizing radiation curing type resin 3 flows from the periphery of the mold body 2a of the forming mold 2. It is therefore possible to exclude bubbles from the entire region of the lens sheet to be manufactured and prevent bubbles from being entrapped between the substrate 4 and the forming mold 2.

<Second Embodiment>

A sheet to be manufactured in the second embodiment of the present invention is a hard-coat-sheet in which a hard coated layer is coated with a protecting layer. A plurality of such sheets is manufactured in accordance with the method as shown in FIGS. 18(A) to 18(F). Such a manufacturing method is applicable not only to formation of the hard-coat-sheets, but also to formation of a protecting layer on the surface of a product such as a metallic screen for shielding electromagnetic wave, a gelatin layer of a color filter or the like, which is apt to be degraded in property by contacting with atmosphere, or formation of a layer for modifying the surface property.

The sheet is manufactured by carrying out a preparation step (A) for preparing a substrate 50 (i.e., a sheet body); a resin-application step (B) for applying ionizing radiation curing type resin 3 in the form of liquid on the substrate 50; a cover film supply step (C) for placing a cover film 52 on the ionizing radiation curing type resin 3; a laminating step (D) for spreading the ionizing radiation curing type resin 3 through the cover film 52; a curing step (E) for irradiating ionizing radiation 7 on the ionizing radiation curing type resin 3 to cure it; and a removing step (F) for removing the cover film 52 from the ionizing radiation curing type resin 3 as cured.

The substrate 50 is for example a translucent plastic sheet. A plurality of substrates 50 is prepared. A glass sheet may be used in place of the plastic sheet. The substrate 50 is placed horizontally (see FIG. 18(A)).

The resin-application step (B), which is a partial-surface application step to apply the ionizing radiation curing type resin in the form of liquid on the upper surface of the substrate 50, forms an uncured resin pool along the pressing-starting side of the substrate 50. The formation of the uncured resin pool is conducted for example by pouring the ionizing radiation curing type liquid resin 3 on the substrate 50 by means of a single nozzle or a plurality of nozzles. In the second embodiment of the present invention ultraviolet ray curing type resin is used as the ionizing radiation curing type resin. Electron beam curing type resin may however be used. The cover film 52, which has a function of preventing the ultraviolet ray curing type resin from curing in an inappropriate manner, is placed on the uncured resin pool (see FIG. 18(C)). The cover film 52 may be formed into a sheet having a relatively large thickness. With respect to a supplying system of the cover film 52, there may be adopted either a system for conveying a plurality of cover films 52 as cut with the use of the suction cups in the same manner as the first embodiment of the present invention, or a system for unrolling a rolled film material and cutting it into a plurality of cover films 52.

The laminating step (D), which is to press the cover film 52 from the pressing-starting side toward the pressing-finishing side to flatten the uncured resin body to form a uncured resin layer on the substrate 50, is carried out by passing the substrate 50, on which the uncured resin pool has been formed and then the cover film 52 has been placed thereon, between a pair of pressing rollers 5a, 5b to spread and flatten the uncured resin pool in a prescribed uniform thickness. The uncured resin pool of the ionizing radiation curing type resin is forcedly pressed by means of the pressing rollers 5a, 5b from the pressing-starting side toward the pressing-finishing side to flow so as to exclude bubbles from a space between the substrate 50 and the cover film 52. Accordingly, an uncured resin layer is formed between the substrate 50 and the cover film 52.

The curing step (E), which is to irradiate ionizing radiation 7 such as ultraviolet ray or electron beam on the ionizing radiating curing type resin 3 through the cover film 52, is carried out by disposing a radiation source such as an ultraviolet ray lamp above the substrate 50 and then irradiating the ionizing radiation 7 on the cover film 52. The ionizing radiation 7, which permeates the cover film 52, acts to the ionizing radiation curing type resin 3 to cure the resin layer. The ionizing radiation curing type resin 3 as cured adheres firmly to the substrate 4. The cover film 52 can however be peeled from the cured resin layer.

The removing step (F) is to remove the cover film 52 from the ionizing radiation curing type resin 3 as cured thorough irradiation of the ionizing radiation 7. The contact surface between the cover film 52 and the ionizing radiation curing type resin layer 3 is flat and smooth without any pattern, which is formed in the case of the Fresnel lens. It is therefore easy to peel the cover film 52 from the one side thereof to the other side thereof. Adhesiveness of the ionizing radiation curing type resin 3 to the cover film 52 is lower than that of the ionizing radiation curing type resin 3 to the substrate 50. The cover film 52 can therefore be peeled from the ionizing radiation curing type resin layer 3.

There may be a case where the cover film 52 is left as it is, providing a product, which is composed of the substrate 50, the ionizing radiation curing type resin layer 3 and the cover film 52. In such a case, the removing step (F) is omitted.

After completion of the removing step (F), cutting operations are applied to the laminate of the substrate 50 and the ionizing radiation curing type resin layer 3 to remove useless end portions having a superfluous amount of ionizing radiation curing type resin 3, in the same manner as the first embodiment of the present invention. Bubbles may be entrapped in the peripheral portions of the laminate. In view of this fact, it is preferable to make the size of the laminate sufficiently larger than the finished product and cut off the four sides of the laminate to provide the finished product without bubbles entrapped.

In the sheet manufacturing method of the present invention, the sheets such as the hard-coat-sheets and the lend sheets are continuously manufactured, while conveying the different kinds of substrates 50 in a mixed state or these substrates 50 and the different kinds of forming molds 2 described in the first embodiment of the present invention in a mixed state on the endless conveying device. The devices for carrying out the resin-application step (B), the lamination step (D), the curing step (E) and the removing step (F) are disposed along the endless conveying device.

The kinds of sheets to be manufactured are different from each other and the kinds of substrates for them are also different from each other. Consequently, forming conditions such as an application starting position, an application finishing position, an application width and an amount of application of the ionizing radiation curing type resin; a size of the substrate; and magnitude of pressing force applied to the substrate, also change depending on such differences. In the sheet manufacturing method of the present invention, an identification device identifies the kind of substrates so that the forming conditions are changed in an appropriate manner based on results of the identification.

With respect to the identification device, there are adopted measures to identify the kind of substrates based on the preset values for each of the substrates so as to permit to make a change in the forming conditions in the same manner as the first embodiment of the present invention. More specifically, when the different kinds of substrates are conveyed in order, which is for example patterned so that the different kinds of substrates appear alternatively, the forming conditions are changed on the basis of such a patterned order. Alternatively, a sensing system may be adopted. In such a case, identification pieces, which are distinguishable from each other, are attached onto the corresponding substrates. A sensor detects the above-mentioned identification piece to identify the kind of substrate. In addition, the above-mentioned preset system and the sensing system may be used in combination.

After the kind of substrate is identified by means of the identification device on the endless conveying device, the forming conditions such as an application starting position, an application finishing position, an application width and an amount of application of the ionizing radiation curing type resin; a size of the substrate; and magnitude of pressing force applied to the substrate are changed to coincide with the optimum forming conditions for the substrate as identified, to carry out the manufacturing steps in sequence. The different kinds of sheets are continuously manufactured in this manner.

The above-described sheet manufacturing method can be carried out by the use of the same apparatus as that shown in FIG. 5. The description will given below of operation of the manufacturing apparatus with reference to FIG. 5.

First, the setting operation of a control device of the manufacturing apparatus is carried out as follows. More specifically, the identification of the two or more different kinds of substrates can be made in accordance with any one of the present system and the sensing system, or combination of these systems.

In the preset system, preset values of information on the number, kind, conveying order and the like of the substrates 50, which are to be placed on the endless conveying device 13, are previously input into the not-shown control device of the lens sheet manufacturing apparatus. The control device has a counting unit for counting the number of substrates 50, which are conveyed on the conveying device. Such a counting operation contributes to identification of the kind of substrate in cooperation of the preset values as input. The control device controls the first nozzles 8, 46, the second nozzles 9, 49, the substrate supply device 11 and the pressing rollers 5a, 5b for each of the substrates on the basis of signals from the counting unit.

In the sensing system, a sensor for identifying the kind of substrate is provided in each of apparatus units for the first nozzle 8, 46, the second nozzles 9, 49, the substrate supply device 11 and the pressing rollers 5a, 5b. For example, a proximity sensor 48 is disposed on the upstream side of the first nozzles 8, 46, the other proximity sensor 48a is disposed on the upstream side of the second nozzles 9, 49, as shown in FIG. 6 in the same manner as the first embodiment of the present invention. Each of the apparatus units identifies the kind of substrate 50 on the basis of the signal from the sensors 48, 48a, to change independently the control sequence.

In combination of the preset system and the sensing system, a proximity sensor is for example disposed on the upstream side of the first nozzles 8 and 46. The preset values of information on the number, kind, conveying order and the like of the substrates 50, which are to be placed on the endless conveying device 13, are previously input into the not-shown control device of the lens sheet manufacturing apparatus. The first nozzle 8, 46, the second nozzles 9, 49, the substrate supply device 11 and the pressing rollers 5a, 5b operate in a conjunction manner on the basis of the information on the substrate 50, which is identified by the sensor, in accordance with control program, which has previously been input into the control device. The substrates, for example, four to ten substrates are placed on the endless conveying device. The information given to the apparatus unit of the second nozzles 9, 49 on the kind of substrate to which the formation steps are to be applied, is delayed relative to the information given to the apparatus unit of the first nozzles 8, 46. The information on the kind of substrate is relayed from the apparatus unit for the previous step to the other apparatus unit for the subsequent step in sequence after completion of the previous step.

After completion of the setting operation of the manufacturing apparatus, driving the endless conveying device 13 circulates the substrates 50 in the sheet manufacturing apparatus. These substrates 50 and the forming molds 2 for the different finished products may be conveyed in a mixed state. These substrates 50 may be different from each other and the forming molds 2 may be different from each other.

The first nozzle 8 or 46 applies the ionizing radiation curing type resin 3 in the form of liquid on the entirety of the upper surface of the substrate 50 to form the first uncured resin layer on the inlet portion of the traveling passage 13a of the conveying device 13. Switching operation is made in accordance with the kind of substrate 50 to use selectively any one of the first nozzles 8, 46. Such an application step, i.e., the first full-surface application step may be omitted, as an occasion demands.

The ionizing radiation curing type resin 3, which circulates in the piping, is poured from the first nozzle 8 or 46, when the substrate 50 moves below the first nozzle 8 or 46 and the discharge valve 22a or 22b is opened. The substrate 50 travels at a constant speed below the first nozzle 8 or 46 so that the ionizing radiation curing type resin 3 is applied from the first nozzle 8 or 46 on the forming mold 2 in a constant thickness. The timer controls the discharging period of time during which the ionizing radiation curing type resin 3 is applied by means of the first nozzle 8 or 46.

The second nozzle 9 or 49 applies the ionizing radiation curing type resin 3 in the form of liquid on one side, i.e., the pressing-starting side of the first uncured layer formed on the substrate 50, on the downstream side of the first nozzle 8 or 46 to form an uncured resin pool on the first uncured layer. Application of the ionizing radiation curing type resin 3 through the second nozzle 9 or 49 is carried out after the operation of the traveling passage 13a of the conveying device 13 is temporarily stopped to keep the forming mold 2 in a non-moving state. The above-mentioned application may be carried out, while continuously operating the traveling passage 13a to travel the substrate 50.

The substrate 50 on which the first uncured layer and the uncured resin pool have been formed is carried to a position of the cover film supply device 11 by the traveling passage 13a of the conveying device 13. The substrate 50 temporarily stops traveling immediately after it reaches to the above-mentioned position. The cover film supply device 11 carries the cover film 52, which has dimensions corresponding to the size of the substrate 50 and drops it thereon.

The position of the cover film 52 is previously determined on the positional determination table 28 so as to coincide with the position of the substrate 50.

After the cover film 52 is placed on the first uncured layer and the uncured resin pool of the ionizing radiation curing type resin 3, which have been applied on the substrate 50, the traveling passage 13a of the conveying device 13 carries the substrate 50 having the first uncured layer and the uncured resin pool to the pressing rollers 5a, 5b. When the substrate 50 having the first uncured layer and the uncured resin pool travels on the traveling passage 13a of the conveying device 13 to a prescribed position, the upper roller 5a descends so that the front portion, i.e., the pressing-starting end of the forming mold 2 is held between the upper and lower rollers 5a, 5b. The pressing force applied by the pressing rollers 5a, 5b is appropriately changed in accordance with the kind of substrate 50. Both the upper and lower rollers 5a, 5b roll to move the substrate 50 having the first uncured layer and the uncured resin pool in one direction. Accordingly, the uncured resin pool is spread on the first uncured layer through the cover film 52 to be flattened, thus forming the second uncured layer on the first resin layer. The first and second uncured layers are actually combined into a single united resin layer. As a result, there is prepared a laminated body having a three-layer structure of the substrate 50, the single united resin layer and the cover film 52.

The traveling passage 13a of the conveying device 13 carries the above-mentioned laminated body, which has passed between the pressing rollers 5a, 5b, to the ionizing radiation irradiating device 12. The laminated body passes below the ionizing radiation irradiating device 12. The laminated body may temporarily stop traveling below the ionizing radiation irradiating device 12. The ionizing radiation irradiating device 12 irradiates ionizing radiation 7 on the single united resin layer of the ionizing radiation curing type resin 3 through the cover film 52 to cure the resin 3. The finished sheet is prepared in this manner.

The traveling passage 13a of the conveying device 13 carries the finished sheet on the lifter 14b. The finished sheet is kept in a non-moving state on the lifter 14b.

The cover film 52 is peeled from the ionizing radiation curing type resin layer 3, which has been cured by irradiation of the ionizing radiation 7 for example by a manual operation.

The different kinds of forming molds 2 for forming the lens sheets, which are described in the first embodiment of the present invention, are also conveyed in a mixed state on the endless conveying device as mentioned above. Accordingly, the appropriate steps as mentioned in the first embodiment of the present invention are carried out for each of the forming molds 2. With respect to the manufacture of the lens sheets, the forming mold 2 from which the semi-finished product has been removed is returned to a prescribed position by the operation of the returning passage 13b. The forming mold 2 is then returned again to the traveling passage 13a so that it can be used for the next formation of the lens sheet.

Figure 18A:
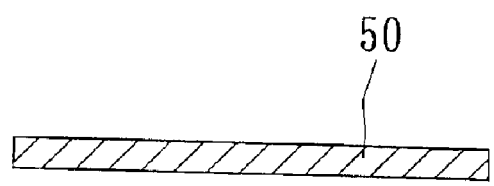
FIGS. 18(A) to 18(F) are descriptive views illustrating steps in sequence of the lens sheet manufacturing method in which the apparatus of the present invention is used.
Figure 18B:
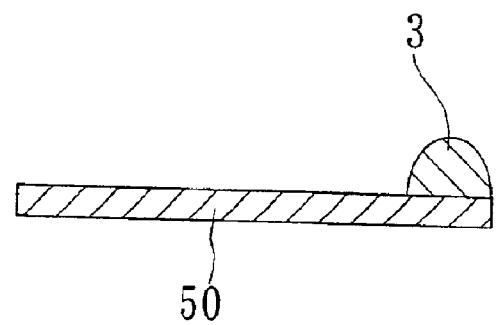
Figure 18C:
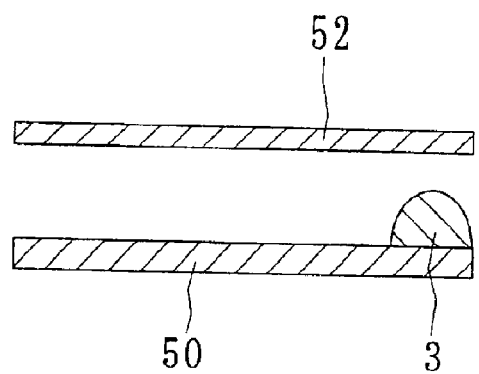
Figure 18D:
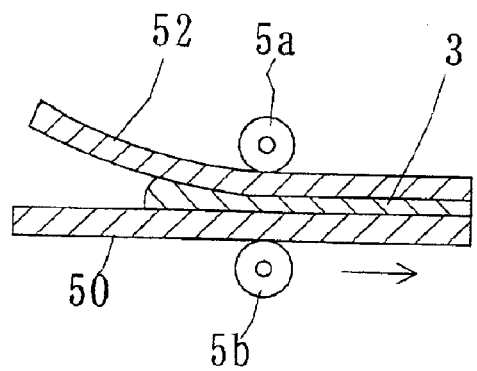
Figure 18E:
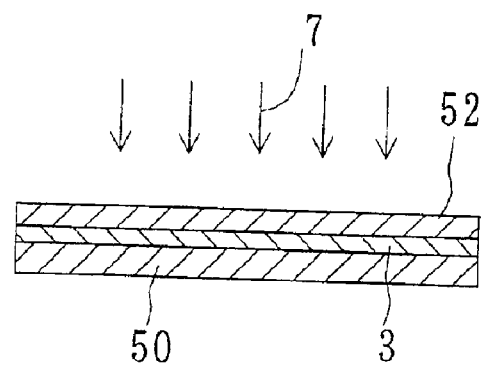
Figure 18F:
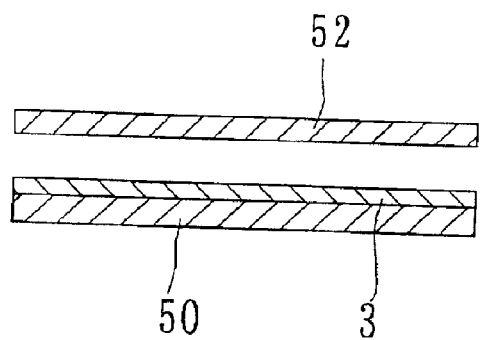
Figure 19A:
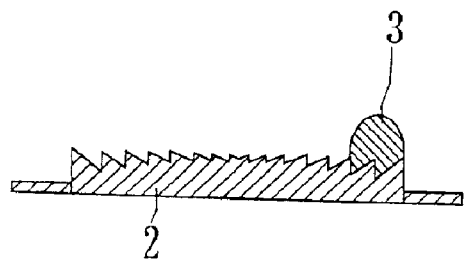
FIGS. 19(A) to 19(E) are descriptive views illustrating modifications of the steps in sequence of the lens sheet manufacturing method in which the apparatus of the present invention is used.
Figure 19B:
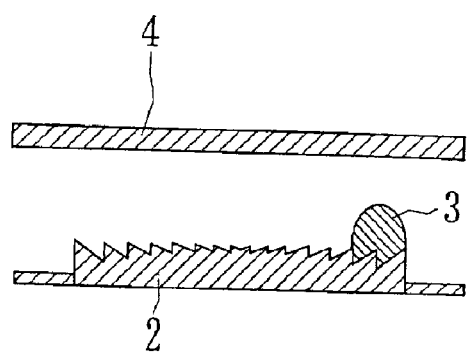
Figure 19C:
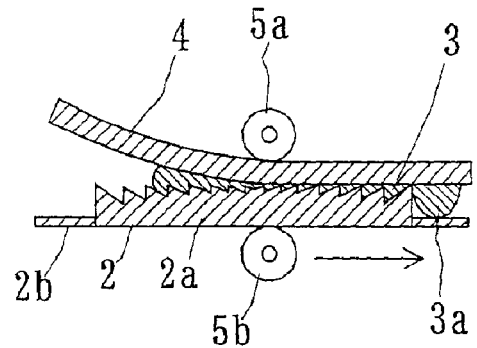
Figure 19D:
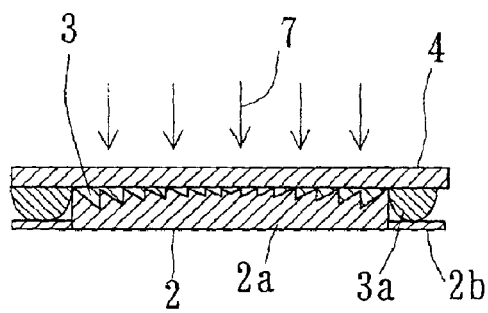
Figure 19E:
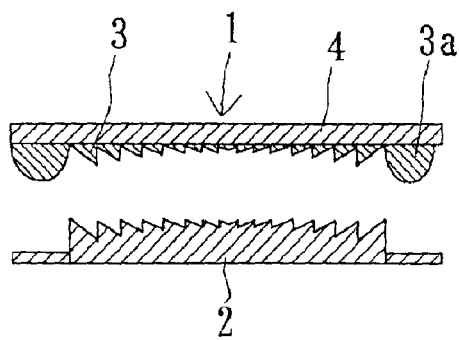
Figure 20A:
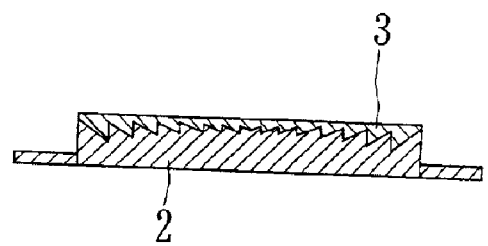
FIGS. 20(A) to 20(F) are descriptive views illustrating the other modifications of the steps in sequence of the lens sheet manufacturing method in which the apparatus of the present invention is used.
Figure 20B:
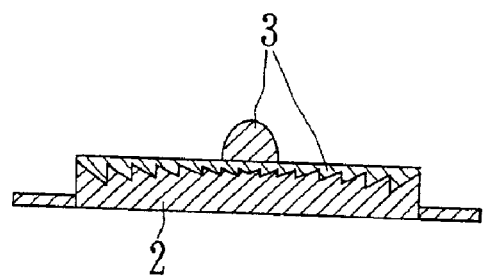
Figure 20C:
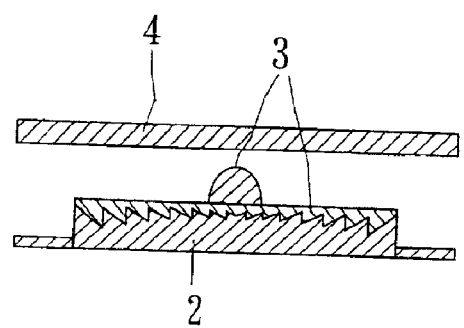
Figure 20D:
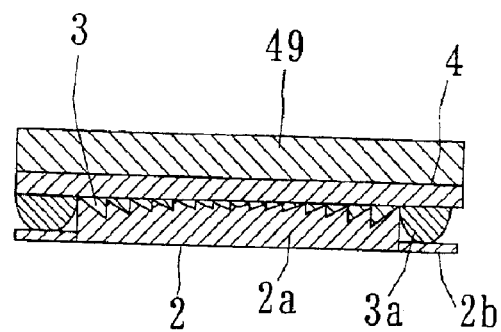
Figure 20E:
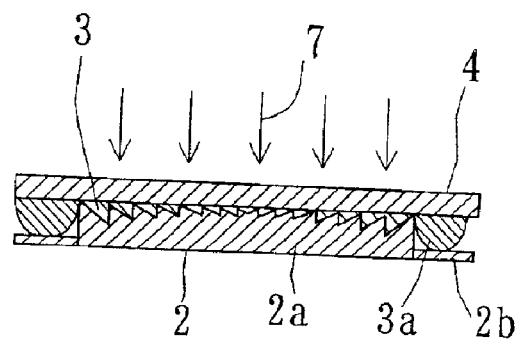
Figure 20F:
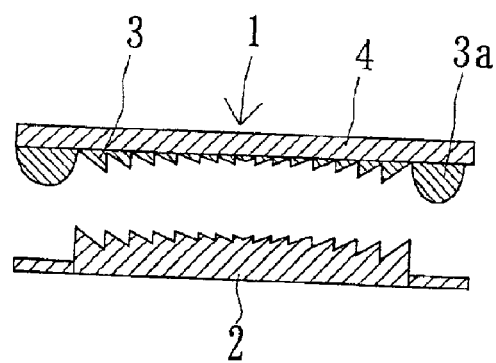

In the second embodiment of the present invention, the cover film 52 may be subjected to the temperature adjusting step for making adjustment of temperature of the cover film 52 in the same manner as the first embodiment of the present invention. The second resin-application step (i.e., the partial-surface application step) may be carried out by applying the ionizing radiation curing type resin 3 in the form of liquid on the central portion of the substrate 50 or the first uncured layer, which has been formed on the substrate 50, to form the uncured resin pool as shown in FIG. 20(B). The lamination step as shown in FIG. 18(D) may be carried out utilizing the surface plates in the same manner as shown in FIG. 20(D).

The preferred embodiments of the present invention are described above. However, the present invention is not limited to these embodiments. The embodiments may be modified as follows:

1. In the method for manufacturing a plurality of kinds of lens sheets, a resin-application step for applying ionizing radiation curing type resin 3 in the form of liquid on the forming mold 2; a laminating step for placing the substrate 4 on the ionizing radiation curing type resin 3 and pressing the substrate 4 and the forming mold 2 from the pressing-starting side toward the pressing-finishing side to provide a laminate structure of the substrate 4 and the resin layer 3; a resin-curing step for irradiating ionizing radiation onto the uncured resin layer through the substrate 4 to cure it; and a removing step for removing the ionizing radiation curing type resin layer 3 as cured from the forming mold 2 together with the substrate 4, are carried out, while conveying the forming molds 2 on the endless conveying device 13. The different kinds of lens sheets 1 are continuously manufactured, while conveying the different kinds of forming molds 2 in a mixed state on the endless conveying device 13. According to such a modification, it is possible to continuously manufacture the different kinds of lens sheets 1, while conveying the different kinds of forming molds 2 in the mixed state on the endless conveying device 13.

2. The lens sheets manufacturing method mentioned in item 1 above, further comprises a step for applying the ionizing radiation curing type resin 3 in the form of liquid on one side, i.e., the pressing-starting side of the first uncured layer, to form an uncured resin pool. According to such a modification, it is possible to supplement an insufficient amount of ionizing radiation curing type resin 3 as first applied, while preventing air from being entrapped between the substrate and the forming mold 2.

3. In the lens sheets manufacturing method mentioned in item 1 or 2 above, at least one of forming conditions such as an application starting position, an application finishing position, an application width and an amount of application of the ionizing radiation curing type resin 3; a size of the substrate 4; and magnitude of pressing force applied to the substrate 4 is changed in accordance with the kind of forming mold 2. According to such a modification, it is possible to continuously manufacture the different kinds of lens sheets under the appropriate forming conditions in accordance with the kind of lens sheet 1.

4. In the lens sheets manufacturing method mentioned in any one of items 1 to 3 above, the forming conditions are changed on the basis of both of present values for each of the kinds of sheets and identification results of the kind of forming mold 2. According to such a modification, even when different kinds of forming molds 2 for respective different kinds of lens sheets 1 are conveyed with certain regularity in conveying order, which is for example patterned so that the different kinds of forming molds 2 appear alternatively, it is possible to conduct formation of the ionizing radiation curing type resin layer for each of the plurality of kinds of lens sheets, while changing forming conditions based on the present values for such a conveying order.

5. In the lens sheets manufacturing method mentioned in any one of items 1 to 3 above, the kind of forming mold is identified by a sensor 48 and the forming conditions are changed on the basis of the identification results. According to such a modification, identification pieces are attached for example on the different kinds of forming molds. A proximity sensor 48 detects the identification piece to identify the kind of forming mold 2. It is therefore possible to manufacture the different kinds of lens sheets 1, while changing the forming conditions in accordance with the kind of forming mold 2.

6. In the lens sheets manufacturing method mentioned in any one of items 1 to 3 above, the forming mold 2 is identified based on both of preset values for each of the kinds of lens sheets and identification results of the forming mold 2. According to such a modification, it is possible to decrease the number of sensor, thus reducing the manufacturing cost.

7. In the lens sheets manufacturing apparatus, a nozzle 8 for applying the ionizing radiation curing type resin 3 in the form of liquid on the forming mold 2; a substrate supplying device for placing the substrate 4 on the ionizing radiation curing type resin 3; a pair of pressing rollers 5a, 5b for pressing the substrate 4 and the forming mold 2 from the pressing-starting side toward the pressing-finishing side to provide a laminate structure of the substrate 4 and the resin layer 3; an ionizing radiation irradiating device 12 for irradiating ionizing radiation 7 onto the uncured ionizing radiation curing type resin layer 3 through the substrate 4 to cure it are disposed along the endless conveying device 13. The different kinds of lens sheets 1 are continuously manufactured, while conveying the different forming molds 2 in a mixed state on the endless conveying device 13. According to such a modification, it is possible to manufacture the different kinds of lens sheets 1, while conveying the different forming molds 2 in a mixed state on the endless conveying device 13. As a result, the different kinds of lens sheets 1 can be manufactured utilizing a single apparatus, without providing a plurality of exclusive apparatuses for the different kinds of lens sheets 1.

8. In the lens sheets manufacturing apparatus mentioned in item 7 above, there is additionally provided a nozzle 9 for applying the ionizing radiation curing type resin 3 in the form of liquid on one side, i.e., a pressing-starting side of the first uncured layer, which has been applied on the forming mold 2, to form an uncured resin pool, in addition to the nozzle 8. According to such a modification, it is possible to supplement an insufficient amount of ionizing radiation curing type resin 3 as first applied, while preventing air from being entrapped between the substrate and the forming mold 2.

9. In the lens sheets manufacturing apparatus mentioned in item 7 or 8 above, an identification device for the forming mold 2 is provided. With the respect to such an identification device, there is adopted a system in which the control device of the lens sheets manufacturing apparatus is programmed so as to identify the kind of forming mold on the basis of the preset values for each of the forming molds, or the other system in which detection of identification pieces, which are different from each other and attached on the different forming molds 2 for the different kinds of sheets, respectively, utilizing a sensor 48, makes it possible to identify the forming mold 2. When the identification device detects the kind of forming mold 2, the forming conditions are changed in accordance with the kind of forming mold 2. The forming conditions includes an application starting position, an application finishing position, an application width and an amount of application of the ionizing radiation curing type resin; a size of the substrate; and magnitude of pressing force applied to the substrate. Changing the forming conditions in accordance with the forming mold 2 makes it possible to continuously manufacture the different kinds of lens sheets 1 in the mixed state.

10. In the lens sheets manufacturing apparatus mentioned in any one of items 7 to 9 above, there are provided nozzles 8, 46, 9, 49 for applying the ionizing radiation curing type resin 3 by an application width in accordance with the forming mold 2. According to such a modification, it is possible to apply the ionizing radiation curing type resin 3 by a required application width in accordance with the kinds of the lens sheet 1, thus reducing an amount of ionizing radiation curing type resin 3 as actually used. The switching operation of the nozzles 8, 46, 9, 49 can be carried out on the basis of identification results of the forming mold 2 utilizing the identification device.

11. In the lens sheets manufacturing apparatus mentioned in any one of items 7 to 9 above, an amount of the ionizing radiation curing type resin 3 applied to each of the nozzles 8, 46, 9, 49 is adjustable in accordance with each of the forming molds. According to such a modification, it is possible to apply the ionizing radiation curing type resin 3 in an appropriate amount in accordance with the kind of lens sheet 1. The switching operation of the supplied amount of resin is carried out on the basis of identification results of the forming mold 2 utilizing the identification device, for example by adjusting the number of rotations of the pump 21.

12. In the lens sheets manufacturing apparatus mentioned in any one of items 7 to 11 above, a position in which the ionizing radiation curing type resin 3 is applied on the forming mold 2 from the nozzle 8, 46, 9, 49, is changed for each of the forming molds 2. According to such a modification, when the front side of the forming mold 2 reaches a position below the nozzle 8, 46, 9, 49, the forming mold 2 temporarily stops traveling, as an occasion demands and discharge of the ionizing radiation curing type resin 3 from the nozzle 8, 46, 9, 49. When the rear side of the forming mold 2 reach a position below the nozzle 8, 46, 9, 49, the discharge of the ionizing radiation curing type resin 3 is stopped. Timing for starting and finishing the discharge of the ionizing radiation curing type resin 3 is changed in accordance with the kind of forming mold 2. Such a change can be made on the basis of identification results of the forming mold 2 utilizing the identification device. A timer is prepared to control the timing of starting or finishing the discharge of the ionizing radiation curing type resin 3 for each of the kinds of forming molds. A switching operation of these timers is carried out.

13. In the lens sheets manufacturing apparatus mentioned in any one of items 7 to 12 above, the substrate supply device 11 includes a plurality of suction cups 34 for sucking the substrate 4. Each of the suction cups 34 is switchable between a suction state and a non-suction state. An area, within which the sucking action is applied, is changed in accordance with each of the forming molds 2. According to such a modification, it is possible to cause only the suction cups 34 as required in accordance with the size of the substrate 4 to ensure a sucking operation of the various kinds of substrate 4. A switching operation of these suction cups 34 can be carried out on the basis of the identification results of the forming mold 2 utilizing the identification device.

14. In the lens sheets manufacturing apparatus mentioned in any one of items 7 to 13 above, the pressing force of the pressing rollers 5a, 5b is changed for each of the forming molds. According to such a modification, it is possible to ensure that the substrate 4 can be pressed by an appropriate pressing force so as to flatten uniformly the ionizing radiation curing type resin 3 on the respective forming molds 2 without causing occurrence of unevenness. Change in the pressing force can be made on the basis of the identification results of the forming mold utilizing the identification device.

In the first aspect of the present invention as described in detail, the method of the first aspect of the present invention for manufacturing a plurality of kinds of sheets, each having a substrate and an ionizing radiation curing type resin layer on at least one of said substrate, comprises: carrying out formation of said ionizing radiation curing type resin layer for each of said plurality of kinds of sheets, while changing forming conditions based on preset values for each of said plurality of kinds of sheets. According to the above-mentioned feature of the first aspect of the present invention, even when different kinds of forming molds for respective different kinds of sheets are conveyed with certain regularity in conveying order, which is for example patterned so that the different kinds of forming molds appear alternatively, it is possible to conduct formation of the ionizing radiation curing type resin layer for each of the plurality of kinds of sheets, while changing forming conditions based on the present values for such a conveying order.

The method of the second aspect of the present invention for manufacturing a plurality of kinds of sheets, each having a substrate and an ionizing radiation curing type resin layer on at least one of said substrate, comprises: identifying a kind of sheet to be manufactured by means of a sensor; and carrying out formation of said ionizing radiation curing type resin layer for each of said plurality of kinds of sheets, while changing forming conditions based on results of said identifying step. According to the above-mentioned features of the second aspect of the present invention, detection of identification pieces, which are different from each other and attached on the different forming molds for the different kinds of sheets, respectively, utilizing a proximity sensor, makes it possible to identify the forming mold to which the formation steps are to be applied, leading to identification of the kind of sheet to be manufactured. It is therefore possible to manufacture the different kinds of sheets in an appropriate manner, while changing the forming conditions.

The method of the third aspect of the present invention for manufacturing a plurality of kinds of sheets, each having a substrate and an ionizing radiation curing type resin layer on at least one of said substrate, comprises: identifying a kind of sheet to be manufactured by means of a sensor; and carrying out formation of said ionizing radiation curing type resin layer for each of said plurality of kinds of sheets, while changing forming conditions based on both of preset values for each of said plurality of kinds of sheets and results of said identifying step. According to the above-mentioned features of the third aspect of the present invention, it is possible to decrease the number of sensor, thus reducing the manufacturing cost.

In the forth aspect of the present invention, said formation may be conducted by utilizing a forming mold for at least one kind of sheets to be manufactured, said forming mold providing a sheet having a reproduced shape based on said forming mold. According to such a feature, it is possible to effectively manufacture sheets with requirement for the reproduced shape and the other sheets without such requirement in a mixed state by the same single manufacturing line.

In the fifth aspect of the present invention, said formation may be conducted by utilizing a cover film for at least one kind of sheets to be manufactured.

In the sixth aspect of the present invention, said formation may be conducted by carrying out the steps of: applying ionizing radiation curing type resin in a form of liquid on said forming mold to form an uncured resin body thereon; placing said substrate on said uncured resin body and then pressing said substrate against said uncured resin body to flatten said uncured resin body; irradiating ionizing radiation on said uncured resin layer through said substrate to cure said uncured resin layer; and removing said cured resin layer together with said substrate from said forming mold. According to such features of the sixth aspect of the present invention, it is possible to manufacture the sheets so as to prevent bubbles from being entrapped into the ionizing radiation curing type resin.

In the seventh aspect of the present invention, said formation may be conducted by carrying out the steps of: applying ionizing radiation curing type resin in a form of liquid on said substrate to form an uncured resin body thereon; placing said cover film on said uncured resin body and then pressing said cover film against said uncured resin body to flatten said uncured resin body; and irradiating ionizing radiation on said uncured resin layer through said pressure sheet to cure said uncured resin layer. According to such features of the seventh aspect of the present invention, it is possible to manufacture the sheets each having the substrate, the resin layer and the cover film.

In the eighth aspect of the present invention, said steps may further comprise removing said cured resin layer together with said substrate from said cover film after said irradiating step. According to such features of the eighth aspect of the present invention, it is possible to manufacture the sheets each having the substrate and the resin layer, without the cover layer.

In the ninth aspect of the present invention, said at least one kind of sheets may be a lens sheet for a transmission type screen. According to such features of the ninth aspect of the present invention, it is possible to manufacture various kinds of the lens sheets for the transmission type screen by the same single manufacturing line.

In the tenth aspect of the present invention, said forming conditions may include at least one of (i) a position in which the ionizing radiation curing type resin is to be applied, (ii) an amount of the ionizing radiation curing type resin; (iii) a kind of the ionizing radiation curing type resin; (iv) a size and thickness of said substrate; (v) a size and thickness of said forming mold; (vi) magnitude of pressing force applied to said substrate and (vii) a position to which the pressing force is to be applied. According to such features of the tenth aspect of the present invention, it is possible to continuously manufacture the different kinds of sheets under the prescribed forming conditions in accordance with the kinds of sheets.

In the eleventh aspect of the present invention, said forming conditions may include at least one of (i) a position in which the ionizing radiation curing type resin is to be applied, (ii) an amount of the ionizing radiation curing type resin; (iii) a kind of the ionizing radiation curing type resin; (iv) a size and thickness of said substrate; (v) a size and thickness of said cover film; (vi) magnitude of pressing force applied to said substrate and (vii) a position to which the pressing force is to be applied.

The apparatus of the twelfth aspect of the present invention for manufacturing a plurality of kinds of sheets, each having an ionizing radiation curing type resin layer, comprises: a control device, in which preset values of forming conditions for each of said plurality of kinds of sheets are previously input, for controlling formation of said ionizing curing type resin layer for each of said plurality of kinds of sheets, while changing forming conditions based on preset values for each of said plurality of kinds of sheets. According to the above-mentioned features of the twelfth aspect of the present invention, even when different kinds of forming molds for respective different kinds of sheets are conveyed with certain regularity in conveying order, which is for example patterned so that the different kinds of forming molds appear alternatively, it is possible to conduct formation of the ionizing radiation curing type resin layer for each of the plurality of kinds of sheets, while changing forming conditions based on the present values for such a conveying order.

The apparatus of the thirteenth aspect of the present invention for manufacturing a plurality of kinds of sheets, each having an ionizing radiation curing type resin layer, comprises: a sensor for identifying a kind of sheet to be manufactured; and a control device, in which preset values of forming conditions for each of said plurality of kinds of sheets are previously input, for controlling formation of said ionizing curing type resin layer for each of said plurality of kinds of sheets, while changing the forming conditions based on results obtained by said sensor. According to the above-mentioned features of the thirteenth aspect of the present invention, detection of identification pieces, which are different from each other and attached on the different forming molds for the different kinds of sheets, respectively, utilizing a proximity sensor, makes it possible to identify the forming mold to which the formation steps are to be applied, leading to identification of the kind of sheet to be manufactured. It is therefore possible to manufacture the different kinds of sheets in an appropriate manner, while changing the forming conditions.

The apparatus of the fourteenth aspect of the present invention for manufacturing a plurality of kinds of sheets, each having an ionizing radiation curing type resin layer, comprises: a sensor for identifying a kind of sheet to be manufactured; and a control device, in which preset values of foaming conditions for each of said plurality of kinds of sheets are previously input, for controlling formation of said ionizing curing type resin layer for each of said plurality of kinds of sheets, while changing the forming conditions based on both of preset values for each of said plurality of kinds of sheets and results obtained by said sensor. According to the above-mentioned features of the fourteenth aspect of the present invention, it is possible to decrease the number of sensor, thus reducing the manufacturing cost.

In the fifteenth aspect of the present invention, the apparatus may further comprise a conveying device for conveying a forming mold for each of said plurality of kinds of sheets; an application device for applying ionizing radiation curing type resin in a form of liquid on said forming mold to form an uncured resin body thereon; a substrate supply device for placing a substrate on said uncured resin body; a pressing device for pressing said substrate against said uncured resin body to flatten said uncured resin body, so as to form a uncured resin layer; and an irradiation device for irradiating ionizing radiation on said uncured resin layer through said substrate to cure said uncured resin layer. According to such features of the fifteenth aspect of the present invention, it is possible to manufacture the sheets so as to prevent bubbles from being entrapped into the ionizing radiation curing type resin.

In the sixteenth aspect of the present invention, the apparatus may further comprise a conveying device for conveying a substrate for each of said plurality of kinds of sheets; an application device for applying ionizing radiation curing type resin in a form of liquid on said substrate to form an uncured resin body thereon; a cover film supply device for placing a cover film on said uncured resin body; a pressing device for pressing said cover film against said uncured resin body to flatten said uncured resin body, so as to form a uncured resin layer; and an irradiation device for irradiating ionizing radiation on said uncured resin layer through said cover film to cure said uncured resin layer.

In the seventeenth aspect of the present invention, said application device may have a plurality of nozzles for applying the ionizing radiation curing type resin. According to such features of the seventeenth aspect of the present invention, the ionizing radiation curing type resin is discharged from the plurality of nozzles so as to provide a sufficient amount of resin as supplied, while preventing bubbles from being entrapped between the resin layer and the forming mold. It is also possible to make a selection of the nozzles in accordance with the kind of forming mold so as to provide an appropriate application of resin according to the properties of the forming mold.

In the eighteenth aspect of the present invention, said plurality of nozzles may apply different kinds of ionizing radiation curing type resin. According to such features of the eighteenth aspect of the present invention, it is possible to easily supply the ionizing radiation curing type resin required to manufacture the sheet to make application thereof.

In the nineteenth aspect of the present invention, said plurality of nozzles may include a plurality of multiple nozzles, each of said multiple nozzles having a structure in which a plurality of micro nozzles are place in a row. According to such features of the nineteenth aspect of the present invention, it is possible to uniformly apply the ionizing radiation curing type resin on the forming mold. Closing certain micro nozzles on the end side of the above-mentioned row makes it easy to change an application width in accordance with the size of the forming mold.

In the twentieth aspect of the present invention, said substrate supply device may include a plurality of suction cups for sucking said substrate, each of said suction cups being switchable between a suction state and a non-suction state. According to such features of the twentieth aspect of the present invention, it is possible to cause only the suction cups as required in accordance with the size of the substrate, which may vary depending on the kind of sheet, to ensure a sucking operation of the various kinds of substrate. Selection of the suction cups to be used may be achieved on the basis of the results of identification of the substrate by the sensor serving as the identifying device.

In the twentieth aspect of the present invention, said cover film supply device may include a plurality of suction cups for sucking said cover film, each of said suction cups being switchable between a suction state and a non-suction state.

The entire disclosure of Japanese Patent Application No. 2001-278380 filed on Sep. 13, 2001 including the specification, claims, drawings and summary is incorporated herein by reference in its entirety.

What is claimed is:

1. A method for manufacturing a plurality of kinds of lens sheets for a transmission type screen, each having a substrate and an ionizing radiation curing type resin layer on at least one of said substrate, comprising:

carrying out formation of said ionizing radiation curing type resin ayer for each of said plurality of kinds of lens sheets, while changing forming conditions based on preset values for each of said plurality of kinds of lens sheets.

2. A method for manufacturing a plurality of kinds of lens sheets for a transmission type screen, each having a substrate and an ionizing radiation curing type resin layer on at least one of said substrate, comprising:

identifying a kind of lens sheet to be manufactured by means of a sensor; and carrying out formation of said ionizing radiation curing type resin ayer for each of said plurality of kinds of lens sheets, while changing forming conditions based on results of said identifying step.

3. A method for manufacturing a plurality of kinds of lens sheets for a transmission type screen, each having a substrate and an ionizing radiation curing type resin layer on at least one of said substrate, comprising:

identifying a kind of lens sheet to be manufactured by means of a sensor; and carrying out formation of said ionizing radiation curing type resin layer for each of said plurality of kinds of lens sheets, while changing forming conditions based on both of preset values for each of said plurality of kinds of lens sheets and results of said identifying step.

4. The method as claimed in any one of claims 1 to 3, wherein:

said formation is conducted by utilizing a forming mold for at least one kind of lens sheets to be manufactured, said forming mold providing a sheet having a reproduced shape based on said forming mold.

5. The method as claimed in claim 4, wherein:

said formation is conducted by carrying out the steps of:

applying ionizing radiation curing type resin in a form of liquid on said forming mold to form an uncured resin body thereon;

placing said substrate on said uncured resin body and then pressing said substrate against said uncured resin body to flatten said uncured resin body;

irradiating ionizing radiation on said uncured resin layer through said substrate to cure said uncured resin layer; and removing said cured resin layer together with said substrate from said forming mold.

6. The method as claimed in claim 5, wherein:

said steps further comprises removing said cured resin layer together with said substrate from said cover film after said irradiating step.

7. The method as claimed in claim 5, wherein:

said forming conditions include at least one of (i) a position in which the ionizing radiation curing type resin is to be applied, (ii) an amount of the ionizing radiation curing type resin; (iii) a kind of the ionizing radiation curing type resin; (iv) a size and thickness of said substrate; (v) a size and thickness of said forming mold; (vi) magnitude of pressing force applied to said substrate and (vii) a position to which the pressing force is to be applied.

8. The method as claimed in claim 6, wherein:

said forming conditions include at least one of (i) a position in which the ionizing radiation curing type resin is to be applied, (ii) an amount of the ionizing radiation curing type resin; (iii) a kind of the ionizing radiation curing type resin; (iv) a size and thickness of said substrate; (v) a size and thickness of said cover film; (vi) magnitude of pressing force applied to said substrate and (vii) a position to which the pressing force is to be applied.

* * * * *